(12) United States Patent
Grandblaise et al.

(10) Patent No.: US 8,194,700 B2
(45) Date of Patent: *Jun. 5, 2012

(54) RESOURCE SHARING BETWEEN A PLURALITY OF COMMUNICATION NETWORKS

(75) Inventors: David Grandblaise, Paris (FR);
Jean-Christophe Dunat, Toulouse (FR);
Remy Pintenet, Issy les Moulineaux (FR)

(73) Assignee: Motorola Solutions, Inc., Schaumburg, IL (US)

( * ) Notice: Subject to any disclaimer, the term of this patent is extended or adjusted under 35 U.S.C. 154(b) by 442 days.

This patent is subject to a terminal disclaimer.

(21) Appl. No.: 11/917,801

(22) PCT Filed: Jun. 6, 2006

(86) PCT No.: PCT/US2006/021967
§ 371 (c)(1),
(2), (4) Date: Sep. 22, 2010

(87) PCT Pub. No.: WO2007/005181
PCT Pub. Date: Jan. 11, 2007

(65) Prior Publication Data
US 2011/0002274 A1    Jan. 6, 2011

(30) Foreign Application Priority Data

Jul. 4, 2005 (EP) .................................. 05291438
Oct. 27, 2005 (EP) .................................. 05292286

(51) Int. Cl.
*H04J 3/16* (2006.01)
(52) U.S. Cl. ........ 370/468; 370/392; 370/337; 370/338; 370/252

(58) Field of Classification Search ........................ None
See application file for complete search history.

(56) References Cited

U.S. PATENT DOCUMENTS 6,792,274 B1   9/2004   Kapanen
(Continued)

FOREIGN PATENT DOCUMENTS

EP         1437667 A1    7/2004
(Continued)

OTHER PUBLICATIONS

"Notification on the Grant of Patent Right for Invention,", Jan. 15, 2010, 4 pages, most relevant pp. 1-2.
(Continued)

*Primary Examiner* — Duc C Ho
(74) *Attorney, Agent, or Firm* — Kenneth A. Haas; Barbara R. Doutre

(57) ABSTRACT

A method of resource sharing between a plurality of communication networks each having a nominal resource allocation of a shared air interface resource and a resource exchange allowance is provided. A temporary resource allocation of a first air interface resource from a nominal resource allocation of a first network is initiated. Subsequently, a plurality of offer rounds are executed with each offer round comprising determining offer values for the first air interface resource. A second network is then selected in response to the determined offer values and subsequently a resource allocation message is transmitted to the second network. The resource allocation message indicates a temporary allocation of at least part of the first air interface resource from the first network to the second network. Consequently, the resource exchange allowance of the second network is reduced accordingly. Each offer round comprises receiving new offer values from the first plurality of networks.

10 Claims, 22 Drawing Sheets

U.S. PATENT DOCUMENTS

| | | | |
|---|---|---|---|
| RE38,787 | E | 8/2005 | Sainton et al. |
| 7,436,788 | B2 | 10/2008 | Huschke et al. |
| 2001/0043613 | A1* | 11/2001 | Wibowo et al. ............... 370/468 |
| 2002/0052914 | A1 | 5/2002 | Zalewski et al. |
| 2002/0137518 | A1 | 9/2002 | Achour |
| 2002/0181462 | A1 | 12/2002 | Surdila et al. |
| 2004/0166835 | A1 | 8/2004 | Johansson et al. |
| 2005/0128971 | A1 | 6/2005 | Huschke et al. |
| 2005/0221795 | A1 | 10/2005 | Hirabe et al. |
| 2005/0260997 | A1 | 11/2005 | Korale et al. |
| 2006/0083205 | A1 | 4/2006 | Buddhikot et al. |
| 2006/0142018 | A1 | 6/2006 | Matz et al. |
| 2006/0210000 | A1* | 9/2006 | Thomas ..................... 375/346 |

FOREIGN PATENT DOCUMENTS

| | | |
|---|---|---|
| EP | 1 742 497 B1 | 10/2008 |
| WO | WO0223758 A1 | 3/2002 |

OTHER PUBLICATIONS

Grandblaise, et al., "Credit Token Based Rental Protocol for Dynamic Channel Allocation," 1st International Conference on Cognitive Radio Oriented Wireless Networks and Communications, 2006, Jun. 8-10, 2006, pp. 1-5, especially sections III and IV.

"PCT/US2006/021967—PCT International Search Report and Written Opinion," WIPO, ISA/US, Jan. 30, 2007.

"PCT/US2006/021967—PCT International Preliminary Report on Patentability,", Jan. 17, 2008.

"European Search Report,", Apr. 17, 2008.

"European 1st Office Action,", Dec. 30, 2008.

"Notification of the First Office Action,", May 15, 2009.

Capar, F., et al., "Spectrum Pricing for Excess Bandwidth in Radio Networks", Personal, Indoor and Mobile Radio Communications, Sep. 5-8, 2004, vol. 4, pp. 2458-2462.

Kloeck, C., et al., "Auctions Sequence as a New Spectrum Allocation Mechanism", IST Summit 2005, Jun. 19-23, 2005, 5 pages.

Mitola, J., III, "Cognitive Radio for Flexible Mobile Multimedia Communications," IEEE International Workshop on Mobile Multimedia Communications MoMuC99, Nov. 15-17, 1999, vol. 22102, pp. 3-10.

Rodriguez, V., et al. "Auction Driven Dynamic Spectrum Allocation: Optimal Bidding, Pricing and Services Priorities for Multi-Rate, Multi-Class CDMA", IEEE 16th International Symposium on Personal Indoor and Mobile Radio Communications, IST Summit, Jun. 19-23, 2005.

English Language Translation of Chinese Notice of Allowance for related Application No. 200680024497.4 mailed on Jan. 22, 2010.

English Language Translation of Chinese Office Action for related Application No. 200680024497.4 mailed on Sep. 11, 2009.

European Search Report for related European Application No. 05291438.9, European Patent Office, The Hague, Netherlands, mailed on Feb. 27, 2006.

Final Office Action mailed on Jan. 3, 2012, in related U.S. Appl. No. 11/917,797, David Grandblaise, filed on Dec. 17, 2007.

Final Office Action mailed on May 11, 2011, in related U.S. Appl. No. 11/917,797, David Grandblaise, filed on Dec. 17, 2007.

First Office Action for related European Patent Application No. 05291438.9 mailed on Aug. 20, 2007.

International Preliminary Report on Patentability for related International Application No. PCT/US2006/021971 mailed on Jan. 17, 2008.

International Search Report and Written Opinion for related International Application No. PCT/US2006/021971 mailed on Jun. 12, 2007.

Non Final Office Action mailed on Jul. 22, 2011, in related U.S. Appl. No. 11/917,797, David Grandblaise, filed on Dec. 17, 2007.

Non Final Office Action mailed on Nov. 26, 2011, in related U.S. Appl. No. 11/917,797, David Grandblaise, filed on Dec. 17, 2007.

Notice of Allowance for related European Application No. 05291438.9 mailed on May 30, 2008.

* cited by examiner

RESOURCE SHARING BETWEEN A PLURALITY OF COMMUNICATION NETWORKS

FIELD OF THE INVENTION

The invention relates to resource sharing between a plurality of communication networks and in particular, but not exclusively, to temporary air interface resource re-allocation between broadband Wireless Metropolitan Area Networks (WMAN).

BACKGROUND OF THE INVENTION

In the last decades, wireless communication systems have become ubiquitous. For example, cellular communication systems, broadband Wireless Metropolitan Area Networks (WMAN) and wireless Local Area Networks (WLANs) have become widespread as a means to provide efficient communication services to e.g. mobile communication units. However, the increased prevalence of wireless communication systems have resulted in a dramatically increased need for air interface resources and the need for efficiently and flexibly utilising the available resource has become essential for the further development of wireless systems.

A method that has been proposed for effectively increasing the utilisation of air interface resource is spectrum sharing wherein a number of independent networks may share the same frequency spectrum. The frequency spectrum may be shared by time division wherein the individual networks are allocated distinct time intervals for transmission.

However, a static allocation of resource to different networks will typically not result in an optimal utilisation of the available resource as the resource requirements for individual networks tend to vary dynamically. However, current approaches for dynamic allocation of a shared air interface resource to individual networks tend to be complex, result in suboptimal resource sharing and suboptimal performance for the individual networks.

Hence, an improved system for resource sharing would be advantageous and in particular a system allowing increased flexibility, improved resource sharing, improved dynamic performance, reduced complexity and/or improved resource sharing would be advantageous.

SUMMARY OF THE INVENTION

Accordingly, the Invention seeks to preferably mitigate, alleviate or eliminate one or more of the above mentioned disadvantages singly or in any combination.

According to a first aspect of the invention there is provided a method of resource sharing between a plurality of communication networks each having a nominal resource allocation of a shared air interface resource and a resource exchange allowance, the method comprising: initiating a temporary resource allocation of a first air interface resource from a nominal resource allocation of a first network; executing a plurality of offer rounds, each offer round comprising determining offer values for the first air interface resource; selecting a second network in response to the determined offer values; sending a resource allocation message to the second network, the resource allocation message indicating a temporary allocation of at least part of the first air interface resource from the first network to the second network; and reducing the resource exchange allowance of the second network by a value determined in response to the resource exchange offer value from the second network; and wherein each offer round comprises: the first network transmitting an offer request to a first plurality of networks; the first plurality of networks transmitting offer messages to the first network, each offer message comprising a resource exchange offer value for at least part of the first air interface resource; and determining the offer values for the first air interface resource in response to the resource exchange offer values.

The invention may allow improved resource sharing between different networks. An efficient management of resource sharing may be achieved. All or some of the nominal resource allocation for one network may temporarily be reassigned to another network (or to a plurality of other networks) without necessitating a complex and/or combined resource allocation. The invention may e.g. allow a temporary resource re-allocation to the network requiring it most through a simple offer mechanism. An efficient dynamic resource sharing is enabled while maintaining the required interworking and coordination between the communication networks. In particular, the iterative nature of the offer rounds allow for an improved resource sharing and distribution to networks most in need of the resource. Different communication networks may employ independent resource allocation of the allocated air interface allocation and may be independently managed and controlled. The individual networks may be owned and operated by different and independent operators. The communication networks may for example be cellular communication systems such as the Global System for Mobile (GSM) communication or the Universal Mobile Telecommunication System (UMTS). The communication networks may for example also be Orthogonal Frequency Division Multiple Access systems. For example, the communication networks may include Wireless Local Area Networks (WLANs) such as IEEE 802.11 networks or broadband wireless radio access systems such as IEEE 802.16 networks.

The invention may in some embodiments provide a cognitive radio based solution to spectrum utilisation and may in particular allow spectrum reuse opportunities by providing the means to identify/detect the free/available resources for sharing.

The invention may in some embodiments enable or facilitate spectrum sharing in a distributed and real time way. In particular, it may provide the mechanisms for spectrum sharing between base stations using a peer-to-peer arrangement.

The invention may in some embodiments enable or facilitate co-existence of heterogeneous radio access systems using the same frequency band based on collaborative mechanisms.

The invention may e.g. be applied to communication networks using Time Division Duplex (TDD) or Frequency Division Duplex (FDD) communication schemes.

The offer request messages and/or offer messages may be exchanged between individual base stations of the first network and the first plurality of networks.

According to an optional feature of the invention, the offer request of at least one offer round comprises an indication of offer values determined in a previous offer round.

This may improve the resource distribution and reallocation and may in particular allow the offering networks to determine a suitable resource exchange offer value.

According to an optional feature of the invention, the first network transmitting offer messages to the first plurality of networks comprises the first network transmitting the offer request to a base station of one of the first plurality of networks, the determination of offer values further comprising: the base station transmitting subscriber station offer requests to subscriber stations of the base station; at least one of the subscriber stations transmitting a subscriber station offer message to the base station, the subscriber station offer message comprising a subscriber station resource exchange offer value; and the base station determining the resource exchange offer value in response to the subscriber station resource exchange offer value and transmitting the resource exchange offer value to the first network.

This may improve the resource distribution and reallocation and may in particular allow a resource distribution that reflects the resource needs of the individual subscriber stations in networks seeking to be allocated a temporary resource.

According to an optional feature of the invention, the sending a resource allocation message to the second network comprises sending the resource allocation message directly to a subscriber station of the second network.

This may facilitate the management and signalling associated with temporary resource reallocation in many embodiments.

According to an optional feature of the invention, the method further comprises: at least one of the subscriber stations transmitting connected equipment offer requests to connected equipment of the at least one of the subscriber stations; at least one of the connected equipments transmitting a connected equipment offer message to the at least one of the subscriber stations, the connected equipment offer message comprising a connected equipment resource exchange offer value; and the at least one of the subscriber stations determining the subscriber station resource exchange offer value in response to the connected equipment resource exchange offer value.

This may improve the resource distribution and reallocation and may in particular allow a resource distribution that reflects the resource needs of the individual equipment connected to the individual subscriber units in networks seeking to be allocated a temporary resource.

According to an optional feature of the invention, the sending a resource allocation message to the second network comprises sending the resource allocation message directly to a connected equipment of the second network.

This may facilitate the management and signalling associated with temporary resource reallocation in many embodiments.

According to an optional feature of the invention, the method further comprises selecting the second network in response to a determination that the resource exchange offer value from the second network for the at least part of the first air interface resource is the highest received resource exchange offer value.

The selection means may for example select the network to which a given resource is temporarily re-allocated as the network providing the highest offer for that specific resource. This may provide a simple and efficient way of providing the available resource to networks most in need of the resource, and may in some embodiments assist in the maximisation of the benefit to the first network of sharing this resource.

According to an optional feature of the invention, the method comprises selecting a plurality of selected networks and allocating different parts of the first air interface resource to the plurality of selected networks so as to maximise the combined resource exchange offer values.

This may allow a flexible resource allocation wherein an available resource is shared between a plurality of networks in accordance with their respective need for the resource, and may in some embodiments maximise the benefit to the first network of sharing the resource.

According to an optional feature of the invention, the first plurality of networks employ a shared Media Access Control (MAC) frame and each of the plurality of communication networks has a nominal allocated time interval of the MAC frame.

The MAC frame may be a shared MAC frame of a radio air interface. The feature may facilitate interoperation and provide a practical system for effective resource sharing. In particular, it may facilitate peer-to-peer based resource sharing over a shared air interface.

According to an optional feature of the invention, the MAC frame comprises a first management subframe for transmission of offer request messages.

This may facilitate interoperation and provide a practical system for effective resource sharing. In particular, it may facilitate peer-to-peer based resource sharing over a shared air interface.

According to an optional feature of the invention, the first management subframe is divided into a plurality of different time slots allocated to different networks.

This may facilitate interoperation and provide a practical system for effective resource sharing. In particular, it may facilitate peer-to-peer based resource sharing over a shared air interface.

According to an optional feature of the invention, the first management subframe comprises a transmission time indication for transmission of offer messages from the first plurality of networks.

This may facilitate interoperation and provide a practical system for effective resource sharing. In particular, it may facilitate peer-to-peer based resource sharing over a shared air interface.

According to an optional feature of the invention, the MAC frame comprises a second management subframe for transmission of offer messages.

This may facilitate interoperation and provide a practical system for effective resource sharing. In particular, it may facilitate peer-to-peer based resource sharing over a shared air interface.

According to an optional feature of the invention, the second management subframe is divided into a plurality of different time slots allocated to different networks.

This may facilitate interoperation and provide a practical system for effective resource sharing. In particular, it may facilitate peer-to-peer based resource sharing over a shared air interface.

According to an optional feature of the invention, the method further comprises operating a contention scheme for the second management subframe.

This may facilitate interoperation and provide a practical system for effective resource sharing. In particular, it may facilitate peer-to-peer based resource sharing over a shared air interface.

According to an optional feature of the invention, the initiating of the temporary resource allocation comprises transmitting an indication of the availability of the temporary resource allocation to other networks; and the method further comprises the step of at least some of the other networks transmitting an indication of interest in the temporary resource allocation.

The first plurality of networks may be selected in response to the received indications of interest. This may facilitate operation and reduce the number of networks involved in the resource reallocation process.

According to an optional feature of the invention, the communication between the first network and the first plurality of networks in the offer rounds is over a radio air interface.

The invention may provide improved and/or facilitated resource sharing based on radio air interface communication links. Complexity may be reduced and the requirement for dedicated or centralised communication and management means can be reduced or eliminated.

According to an optional feature of the invention, the shared air interface resource is a frequency band and the first air interface resource comprises all frequency carriers in the frequency band. This may provide for a simple sharing of resource which may provide efficient performance and which typically may reduce the impact of the sharing of resource on the first network and/or the second network. The frequency band may be a contiguous or fragmented frequency band.

According to an optional feature of the invention, the at least part of the first air interface resource corresponds to the frequency band in a time interval.

This may facilitate efficient resource sharing.

According to a different aspect of the invention, there is provided a communication system for resource sharing between a plurality of communication networks each having a nominal resource allocation of a shared air interface resource and a resource exchange allowance, the communication system comprising: means for initiating a temporary resource allocation of a first air interface resource from a nominal resource allocation of a first network; means for executing a plurality of offer rounds, each offer round comprising determining offer values for the first air interface resource; means for selecting a second network in response to the determined offer values; means for sending a resource allocation message to the second network, the resource allocation message indicating a temporary allocation of at least part of the first air interface resource from the first network to the second network; and means for reducing the resource exchange allowance of the second network by a value determined in response to the resource exchange offer value from the second network; and wherein the means for executing a plurality of offer rounds is arranged to for each offer round: transmit an offer request to a first plurality of networks from the first network; transmit offer messages from the first plurality of networks to the first network, each offer message comprising a resource exchange offer value for at least part of the first air interface resource; and determine the offer values for the first air interface resource in response to the resource exchange offer values.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to broadband Wireless Metropolitan Area Networks (WMAN) such as the IEEE 802.16, and Wireless Local Area Networks (WLANs) communication networks such as 802.11 but it will be appreciated that the invention is not limited to this application but may be applied to many other communication networks such as for example GSM (Global System for Mobile communication) or UMTS (Universal Mobile Telecommunication System) cellular communication systems.

Figure 1:
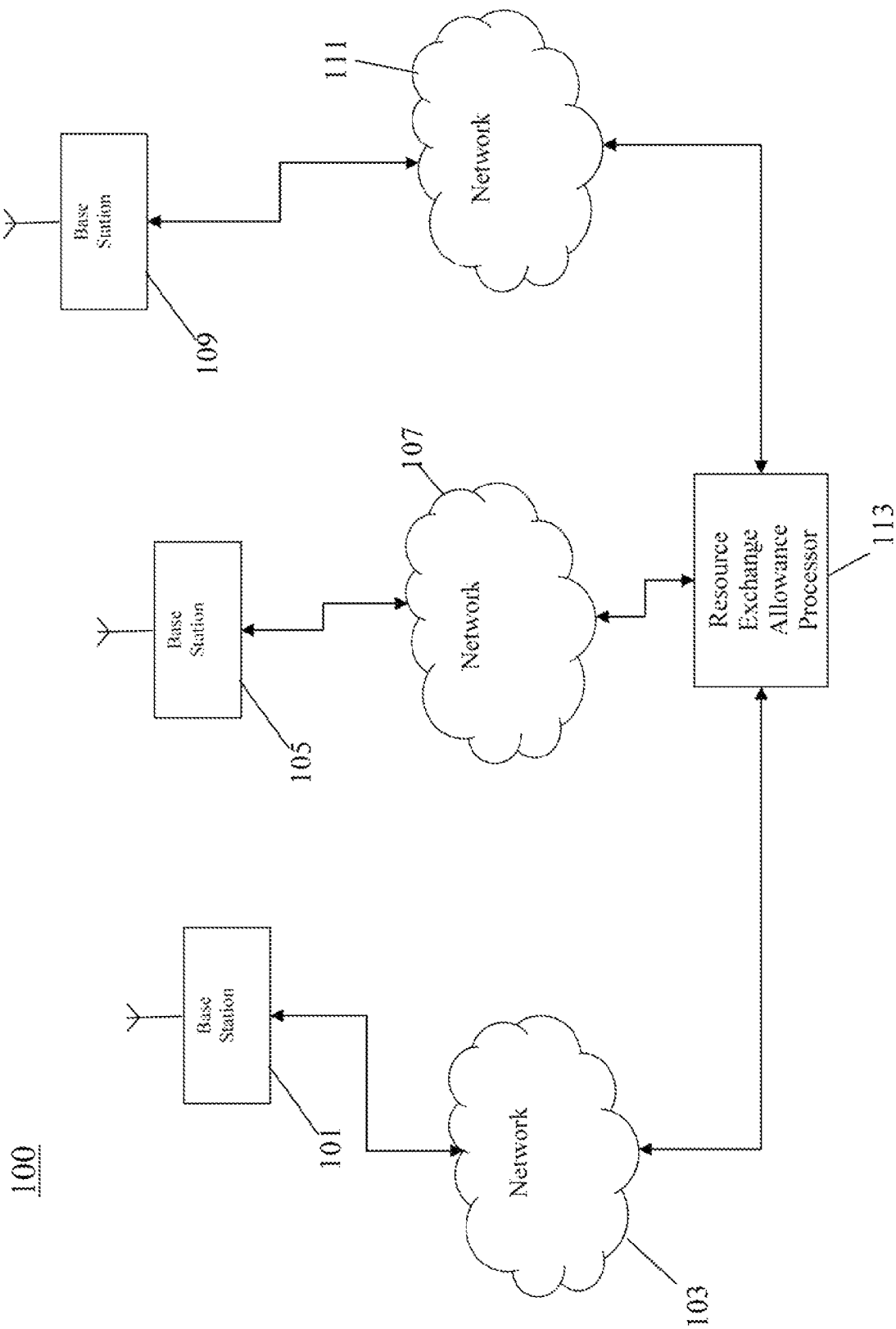
FIG. 1 illustrates an example of a combined communication system arrangement comprising three communication networks in accordance with some embodiments of the invention.

FIG. 1 illustrates an example of a combined communication system arrangement comprising three different individual broadband Wireless Metropolitan Area Networks (WMAN) 103, 107, 111.

Each of the networks 103, 107, 111 comprises all the required functionality for supporting communication services in accordance with the Technical Specifications of the WMAN system. In the specific example, the networks 103, 107, 111 comprise functionality for supporting communications over an IEEE 802.16 air interface. Thus, in particular each network 103, 107, 111 comprises at least one base station 101, 105, 109 which can transmit and receive signals over the air interface of the individual communication system (for clarity the base stations 101, 105, 109 are shown coupled to the networks 103, 107, 111 in FIG. 1 but it will be appreciated that they are to be considered part of the networks 103, 107, 111)

In the example of FIG. 1, the three networks 103, 107, 111 employ spectrum sharing wherein the same frequency spectrum is used by the air interface communications of all three networks 103, 107, 111. In the specific example, the three networks use time division such that the three networks 103, 107, 111 have access to the full frequency spectrum at different times. Specifically, each of the three networks can use OFDM and OFDMA based communications in the full frequency spectrum.

Specifically, the three networks are arranged to use the same MAC (Media Access Control) frame structure on the air interface. The networks 103, 107, 111 are furthermore synchronised such that the MAC frames for transmissions over the air interface are frame synchronised.

In the example, each of the networks is allocated a nominal resource allocation corresponding to a specified time interval in each frame. Specifically, the downlink (forward link) and uplink (reverse link) MAC frames comprise three time intervals of equal size with one time interval being allocated to each of the networks 103, 107, 111. Each time interval can be used by different systems while the time intervals are interleaved.)

Thus, within an allocated time interval, the appropriate network 103, 107, 111 is free to communicate over the air interface but this is not allowed during the time intervals allocated to other networks 103, 107, 111.

Figure 2:
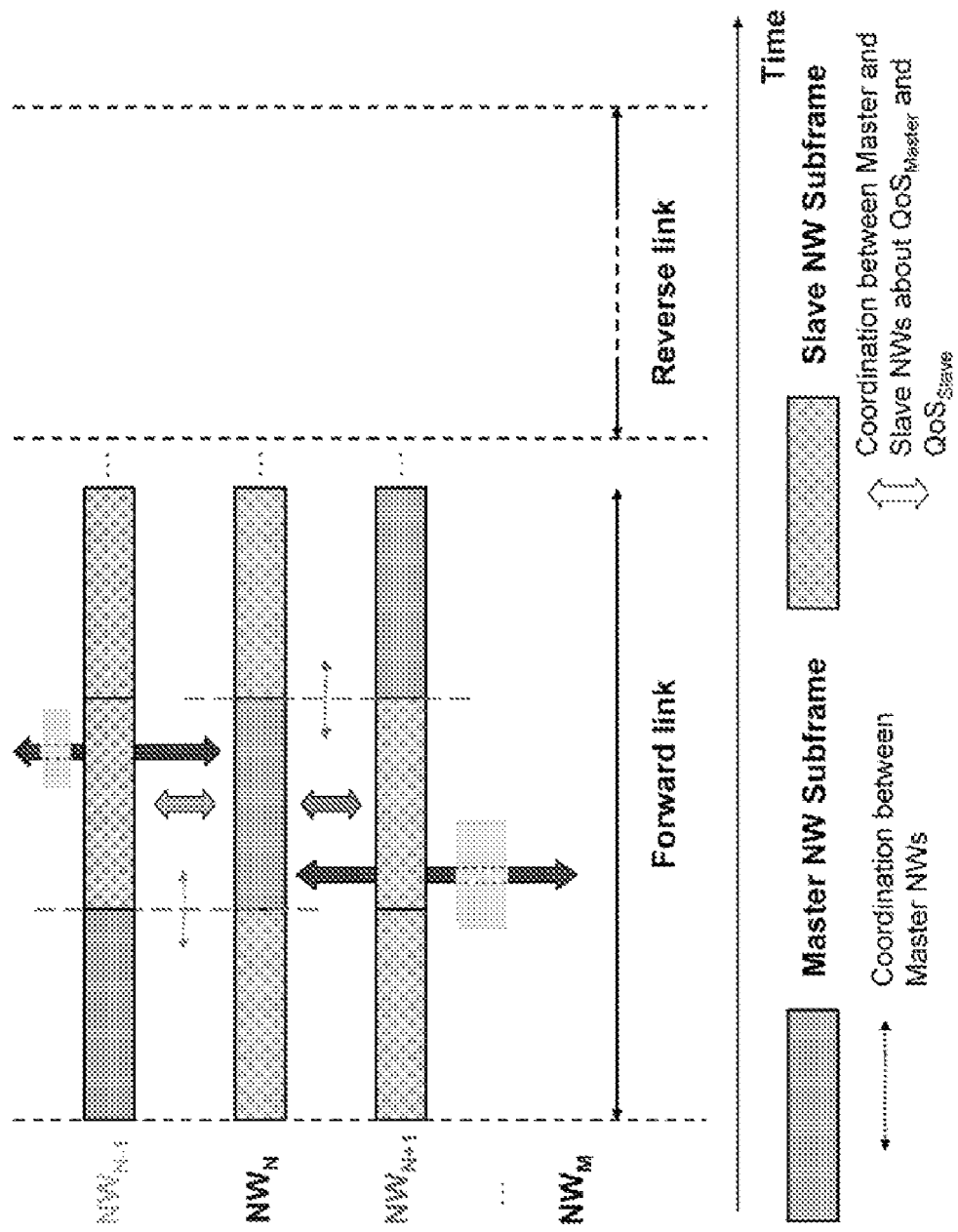
FIG. 2 illustrates an example of a Time Division Duplex frame structure for a plurality of networks using spectrum sharing.

FIG. 2 illustrates an example of a frame structure for a plurality of networks 103, 107, 111 using spectrum sharing. In the example, for each time interval, the network 103, 107, 111 which is nominally allocated the resource is denoted the master network and the other networks are denoted slave networks.

The individual networks 103, 107, 111 independently manage and control the operation of the networks. Specifically, each of the networks is at any time allocated a given air interface resource and the management of this air interface resource allocation is performed without any consideration of the operation of the other networks 103, 107, 111. Thus, specifically, the allocation of resource to individual calls and base stations in the individual network 103, 107, 111 is performed with consideration of the allocated resource but without consideration of how other communication systems are managing the resource allocated to them.

Although spectrum sharing may allow an efficient sharing of resource, a static allocation is inefficient as it may not take into account the dynamic and different resource requirements of the individual networks 103, 107, 111.

In the system of FIG. 1, the resource sharing of the common frequency band may be improved by a temporary resource allocation of resource from the nominal resource allocation of one network to another network.

In the system, each of the networks 103, 107, 111 is allocated a resource exchange allowance which may be used when borrowing resource from another network. In the system, a resource may temporarily be allocated from one network to another. In response, the resource exchange allowance of the network receiving the resource will be reduced whereas the resource exchange allowance of the network providing the resource is increased.

The communication system of FIG. 1 specifically comprises a resource exchange allowance processor 113 which stores the resource exchange allowances of the networks 103, 107, 111. The stored resource exchange allowances are updated when resource is temporarily re-allocated and thus the resource exchange allowance provides an indication of the resource the individual has borrowed to or from other communication networks.

Figure 3:
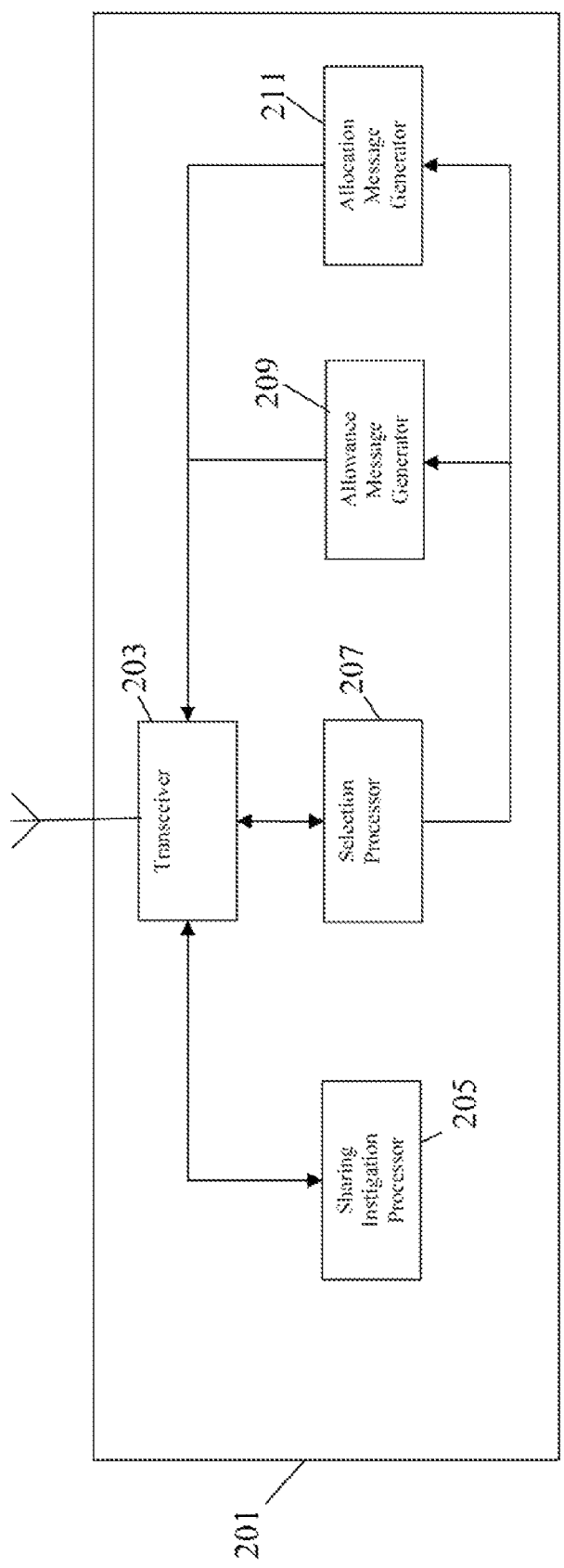
FIG. 3 illustrates an example of an apparatus for resource sharing in accordance with some embodiments of the invention.

FIG. 3 illustrates an example of an apparatus 201 for resource sharing in accordance with some embodiments of the invention. The apparatus may be implemented in any suitable location and/or may be distributed between different locations and between different networks. In the specific example, the apparatus 201 is implemented in the first base station 101.

The apparatus 201 comprises a transceiver 203 which is arranged to communicate with subscriber stations supported by the base station as well as base stations of the other networks 107, 111.

The apparatus 201 further comprises a sharing instigation processor 205 which is coupled to the transceiver 203. The sharing instigation processor 205 is arranged to initiate a temporary resource allocation of a first air interface resource from a nominal resource allocation of the first network.

For example, the sharing instigation processor 205 can detect that the first network 103 has spare resource that is not used and which it can allow other networks to use. In response, the sharing instigation processor 205 can generate resource availability messages and offer request messages which are transmitted over the air interface to other networks by the transceiver 203.

In response, the transceiver 203 can receive offer messages from the other networks 205, 209. Each offer message will comprise a resource exchange offer value for at least some of the resource available for sharing. The resource exchange offer value is indicative of an amount of reduction in its resource exchange allowance that the network transmitting the offer message is willing to accept in return for a temporary allocation of the specified resource.

As will be described later, the apparatus 201 is arranged to iterate the offer process of transmitting offer request messages and receiving offer messages until a termination criterion is met (e.g. that a certain duration has passed).

The apparatus 201 further comprises a selection processor 207 which is coupled to the transceiver 203 and which is fed the received resource exchange offer values following the plurality of offer rounds. In response, the selection processor 207 proceeds to select a specific network to which the given resource is to be temporarily re-allocated. It will be appreciated that resource may be allocated to a plurality of other networks in many embodiments.

For example, for a given resource, the selection processor 207 can simply select the network which has the highest resource exchange offer value, i.e. to the network which is willing to accept the highest reduction in its resource exchange allowance. As this reduction can be seen as a penalty value for the temporary borrowing of resource, the selection processor 207 can automatically select the network which is most in need of the available resource and thus an efficient resource sharing can be achieved through a low complexity system.

The resource exchange offer values can be an offer value for a given unit of resource. For example, the received resource exchange offer values can specify an amount of reduction in the resource exchange allowance the specific network is willing to accept for the allocation of a single carrier in each time interval of, say, 1/100th of the MAC frame duration. The total offer values compared by the selection processor 207 can in such a case be determined by multiplying the specific offer value with the number of carriers and the number of time intervals of the resource that may be allocated.

The selection processor 207 is coupled to an allowance message generator 209 which is arranged to transmit an allowance message to the resource exchange allowance processor 113 causing the resource exchange allowance for the selected network to be reduced. The communication can for example be over the air interface by the transceiver or can be through the first network via a suitable network interface (not shown).

Specifically, the allowance message generator 209 can calculate a resource exchange allowance reduction in response to the resource exchange offer value and can send this value to the resource exchange allowance processor 113. Thus, the allowance message generator 209 causes the resource exchange allowance of the selected network to be reduced by a value determined in response to the resource exchange offer value from the second network.

If the resource exchange allowance processor 113 identifies that the resource exchange allowance of the network receiving the temporary allocation falls below zero, it may notify the apparatus 201 of this fact. In response, the apparatus 201 will prevent the reallocation of resource to this network.

The selection processor 207 is further coupled to an allocation message generator 211 which is further coupled to the network interface 203 and which is arranged to transmit a resource allocation message to the selected network. The resource allocation message comprises an indication of the temporary allocation of at least part of the available resource. Following receipt of the resource allocation message, the selected network can proceed to use the borrowed resource. Specifically, air interface transmission in a re-allocated time interval nominally allocated to the first network 103 can be scheduled in the selected network.

Figure 4:
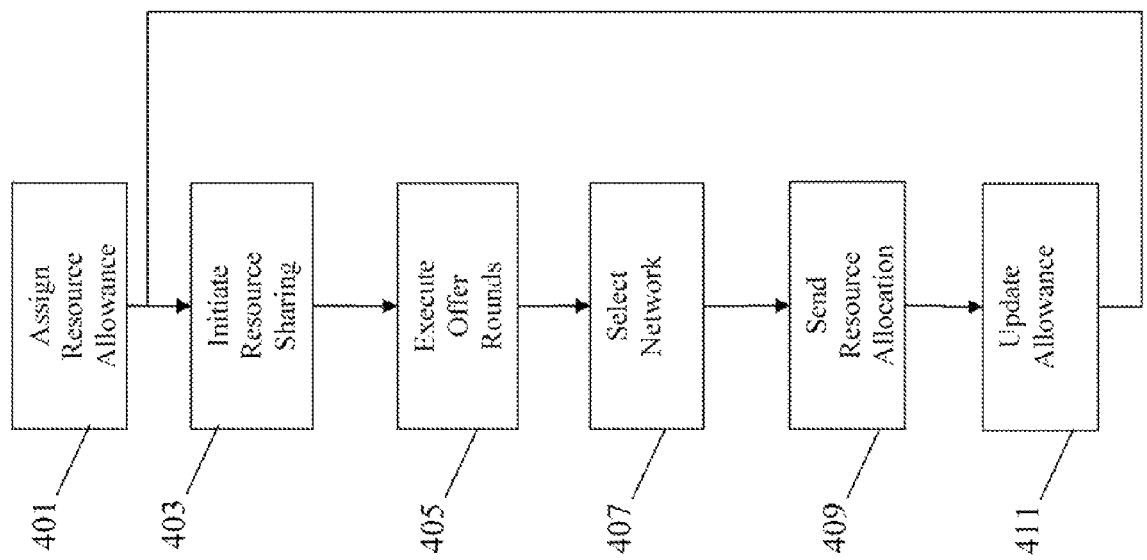
FIG. 4 illustrates an example of a method for resource sharing in accordance with some embodiments of the invention.

FIG. 4 illustrates an example of a method for resource sharing in accordance with some embodiments of the invention. The method will be described with reference to the apparatus of FIG. 3.

The method initiates in step 401 wherein the resource exchange allowance processor 113 is initialised with a resource exchange allowance for each network 103, 107, 111. In the following exemplary description, the resource exchange allowance will be measured in an arbitrary unit referred to as a credit token. The resource exchange allowance processor 113 may for example be initialised with each network 103, 107, 111 being allocated a predetermined amount of credit tokens.

Step 401 is followed by step 403 wherein a temporary resource allocation of an air interface resource from the nominal resource allocation of a network is initiated.

The initiation may be initiated by the network seeking to temporarily lend resource or may be initiated by a network seeking to borrow resource.

For example, as previously described, the sharing instigation processor 205 can detect that some resource is not used in the first network 103 or that some resource is only used by low priority services and that it would be desirable to temporarily re-allocate this resource in return for credit tokens. The sharing instigation processor 205 can accordingly send out messages indicating that resource is available to be shared.

As a specific example, the first network 103 can send a resource availability message indicating that the frequency band is available from starting time $T_{start}$ to ending time $T_{end}$ ($T_{end}-T_{start}$). This time interval will thus make the time frame interval allocated to the first network 103 available to other networks for a fraction of the duration. The first network 103 may in addition include an indication of a minimum number of credit tokens required per time interval for the first network 103 to be willing to temporarily reallocate the resource.

Step 403 is followed by step 405 wherein offer rounds are executed. In each offer round, the first base station 101 transmits offer request messages to base stations 105, 109 of the other networks 107, 111.

The base stations 105, 109 of the other networks 107, 111 then determine resource exchange offer values for at least part of the first air interface resource and transmit these back to the first base station 101 in offer messages. The offer messages can specifically indicate a number of credit tokens offered per resource unit, such as the number of credit tokens per time interval and/or per carrier.

Specifically, the other networks 107, 111 can send an offer message comprising an offer in the form of an offer vector ($BID_k$ where k is an index for the network) which specifically may include the following information:
  The amount of credit tokens offered per time unit ($CT_k$),
  The fraction $x_k$ of the offered time the offer $CT_k$ applies to and/or,
  The time interval [$T_{Start\,k}$, $T_{End\,k}$] to which the offer applies (where [$T_{Start\,k}$, $T_{End\,k}$] ⊂ [$T_{Start}$, $T_{End}$]).

Thus the offer vector may specifically be denoted by $BID_k=\{CT_k, x_k, T_{Start\,k}, T_{End\,k}\}$ The first base station 101 then proceeds to determine offer values for the other base station 105, 109 from the received offer messages. Specifically, the offer value for a given network can be determined as the number of credit tokens offered per resource unit.

The first base station 101 then proceeds to transmit a second offer request message comprising the determined offer values. Upon receiving this offer request message, the other base stations 105, 109 can determine whether to increase the previous offer value. The offer rounds may be repeated until for example a given offer value per resource unit has been reached or until a predetermined time interval has passed.

Step 405 is followed by step 407 wherein a network may be selected to be temporarily allocated an air interface resource. Specifically the network having provided an offer value corresponding to the highest number of credit tokens over the requested renting time period and the requested amount of carriers) can be selected to be temporary allocated the requested resource.

Step 407 is followed by step 409 wherein resource allocation messages identifying the awarded air interface resource is transmitted to the individual networks 107, 111.

Step 409 is followed by step 411 wherein a resource exchange allowance message is transmitted to the resource exchange allowance processor 113. The resource exchange allowance message comprises an identification of the credit tokens which each network being allocated resource has offered for that resource.

In response, the resource exchange allowance processor 113 updates the stored values for the resource exchange allowances of the different networks 103, 107, 111. Specifically, it can reduce the networks 103, 107, 111 having been allocated air interface resource by the corresponding number of credit tokens.

In addition, the resource exchange allowance processor 113 can increase the resource exchange allowance of the first network 103 e.g. by the total number of credit tokens offered by the other networks in return for the allocated resource.

Thus the system can also provide the means to award networks 103, 107, 111 with additional resource exchange allowance in return for the sharing of their resource. This can provide an incentive for networks to share resource.

In some embodiments, each of the base stations may support one or more subscriber stations which again support one or more connections for connected equipment executing an application requiring an air interface resource between the BS and the subscriber station.

Specifically, the system can comprise a plurality of IEEE 802.16 networks. In such a nested system, the base stations can communicate directly in peer to peer using a shared MAC structure divided into time intervals for each system. Such an exemplary system will be described in detail in the following.

Figure 5:
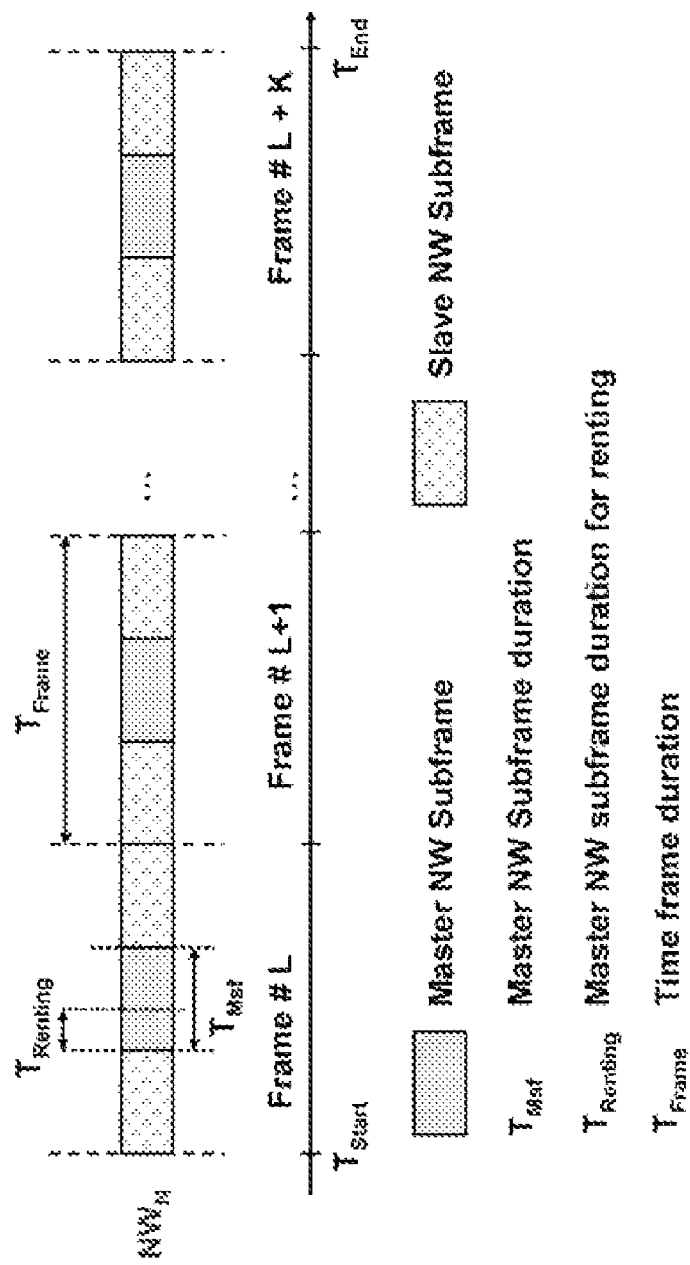
FIG. 5 illustrates an example of a MAC frame format suitable for some embodiments of the invention.

In the example, a dynamic inter base station spectrum sharing algorithm based on a plurality of iterations is described. In the system, distributed signalling mechanisms over the air interface are used to support the credit tokens transactions (selling, purchase and awarding) between base stations. During the offer rounds, the nested level transaction mechanisms are used to derive an offer value $BS\_CT_k$ that is used for each iteration. Specifically, the description provides details of the implementation of an air interface distributed signalling mechanisms using a MAC frame as illustrated in FIG. 5.

In the following the following notation will be used:
$BS_N$ denotes the base station BS belonging to the master network $NW_N$, where the master network is the network providing the additional resource.
$BS_k$ denotes the base station belonging to the slave network $NW_k$, where the master network is the network providing the additional resource.
$SS_{j,k}$ denotes subscriber station "j" attached to base station $BS_k$,
$CC_{i,j,k}$ denotes connection "i" (or connected equipment "i") connected to $SS_{j,k}$.

In the example:
Each $CC_{i,j,k}$ can dynamically generate an offer value $CC\_CT^{(n)}_{i,j,k}$ at the $n^{th}$ iteration. This offer value corresponds to an amount of credit tokens per domain unit (where the domain unit can be a time and/or frequency domain unit) the CC wants to spend to win the "extra" bandwidth during the $n^{th}$ iteration of the offer rounds,
Each $SS_{j,k}$ can dynamically generate an offer value $SS\_CT^{(n)}_{j,k}$ at the $n^{th}$ iteration. This offer value corresponds to the amount of credit tokens per domain unit corresponding to the $\{CC_{i,j,k}\}$ attached to that $SS_{j,k}$ during the $n^{th}$ iteration of the offer rounds,
Each $BS_k$ can dynamically generate an offer value $BS\_CT^{(n)}_k$ at the $n^{th}$ iteration. This offer value corresponds to the amount of credit tokens per domain unit corresponding to the $\{SS_{j,k}\}$ attached to that $BS_k$ during the $n^{th}$ iteration of the bidding phase.

Figure 6:
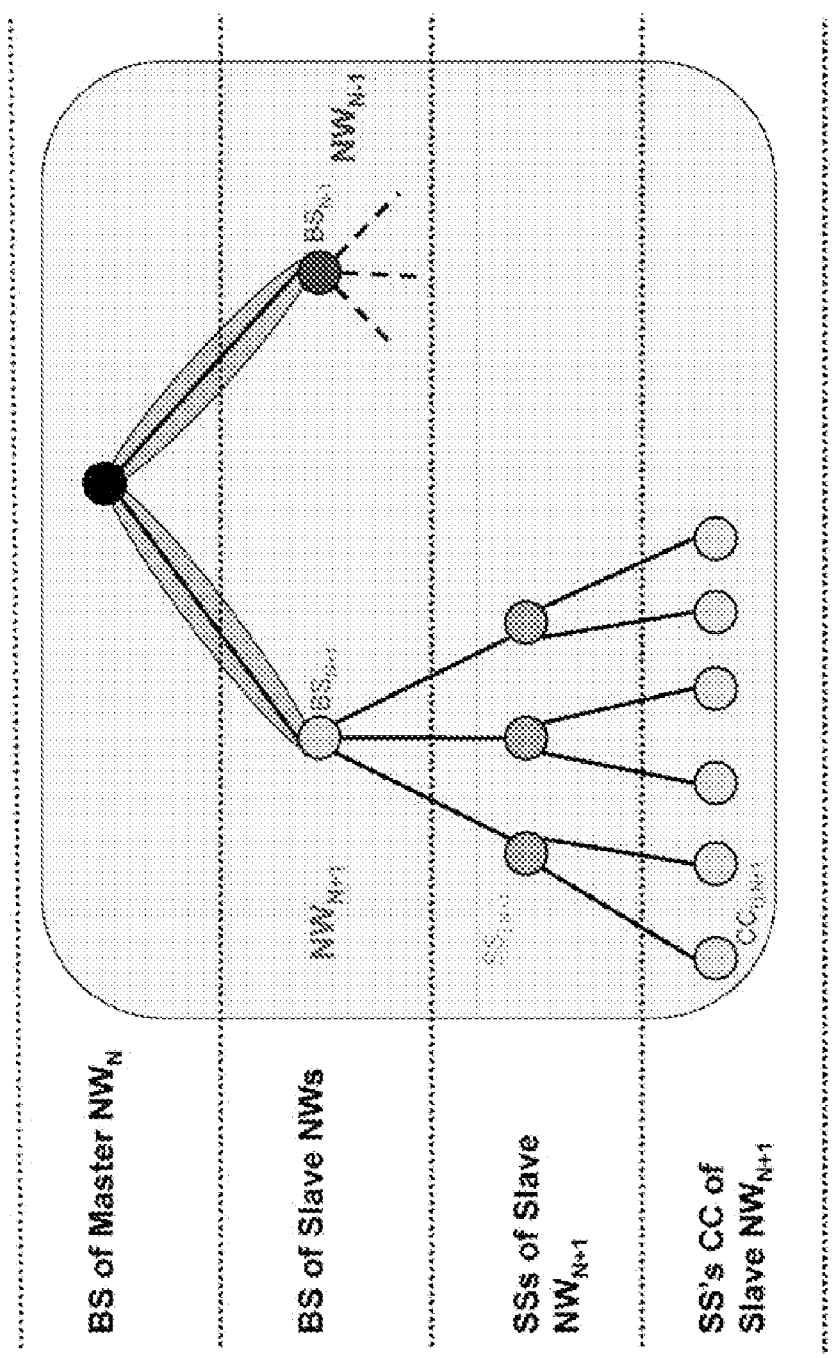
FIG. 6 illustrates an example of a hierarchical arrangement of network nodes.
Figure 7:
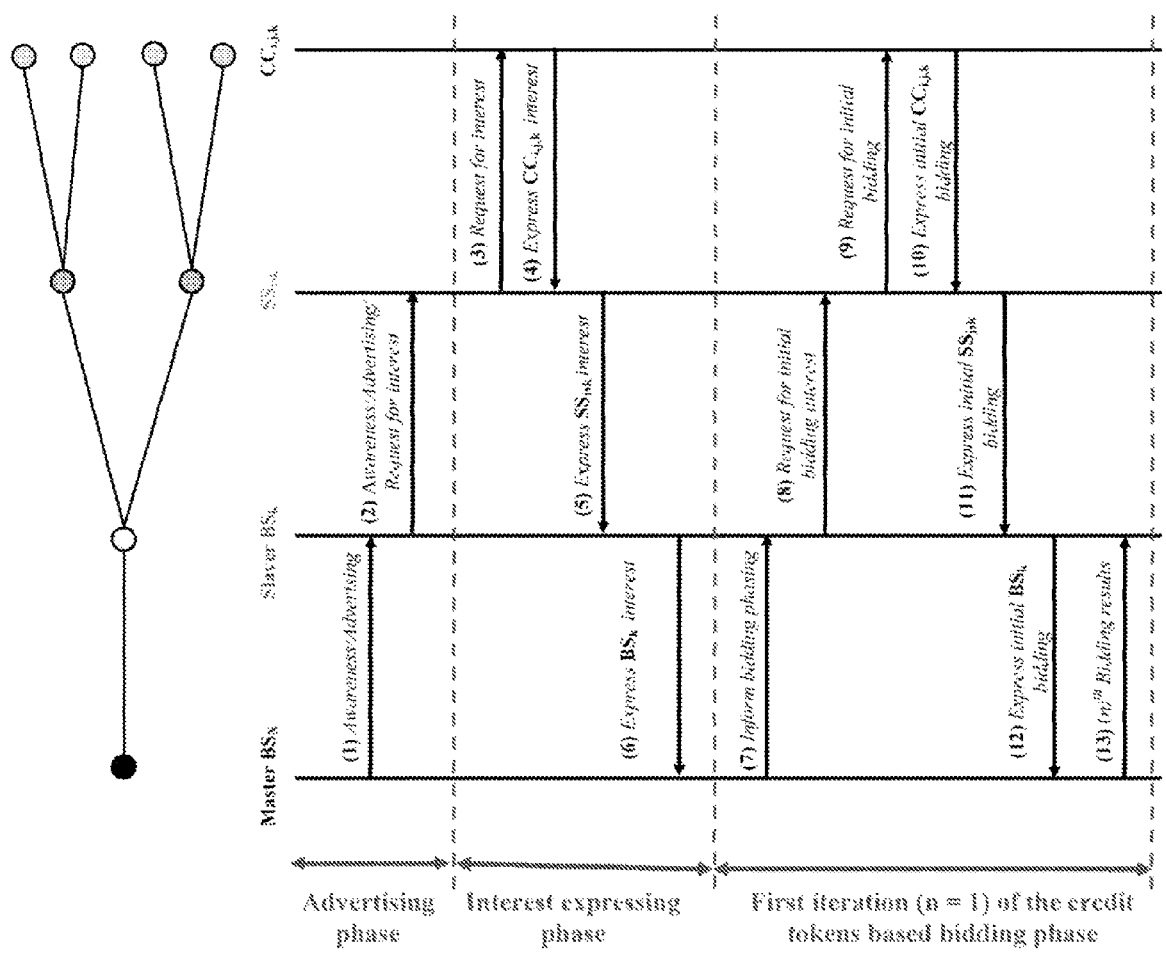
FIG. 7 illustrates an example of signalling for a temporary resource allocation in accordance with some embodiments of the invention.
Figure 8:
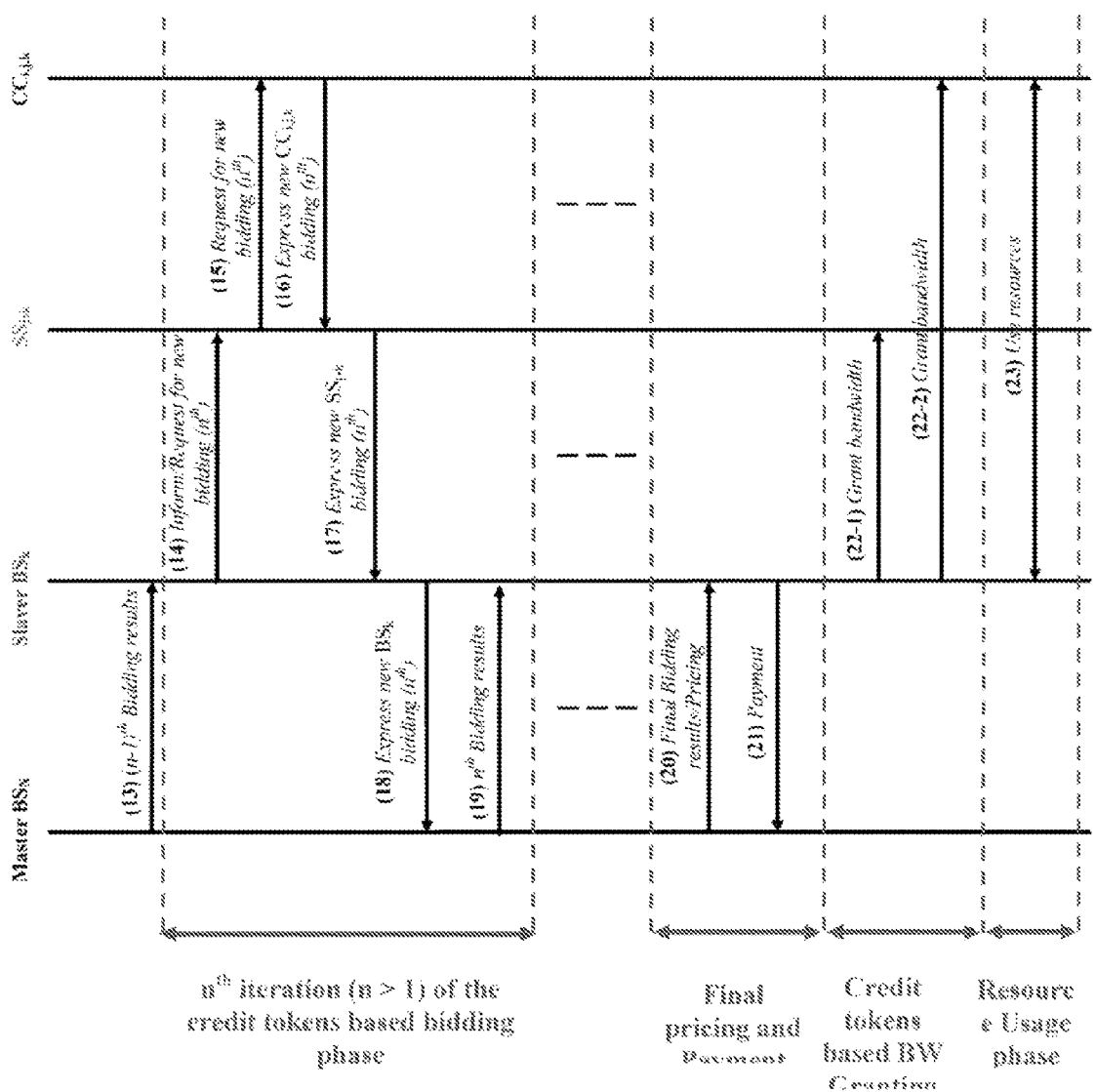
FIG. 8 illustrates an example of signalling for a temporary resource allocation in accordance with some embodiments of the invention.

In the example, a hierarchical arrangement of network nodes as illustrated in FIG. 6 is thus implemented. In this system, a dynamic auctioning/bidding cycle between one $BS_N$ of master $NW_N$ and several $BS_k$ of different slave $NW_k$ is implemented by iteratively executing offer rounds. FIGS. 7 and 8 illustrate the signalling for a temporary resource allocation based on such offer rounds. For simplicity and brevity, the process is illustrated for one $BS_N$ (the first base station 101) and one $BS_k$ (the second base station 105) and corresponding $SS_{j,k}$ and $CC_{i,j,k}$ of a given slave $NW_k$ (the second network 107). The cycle is composed of different phases, and each phase is composed of several sequences.

In the following a description of a super MAC frame that is used by the detailed example is described.

Figure 9:
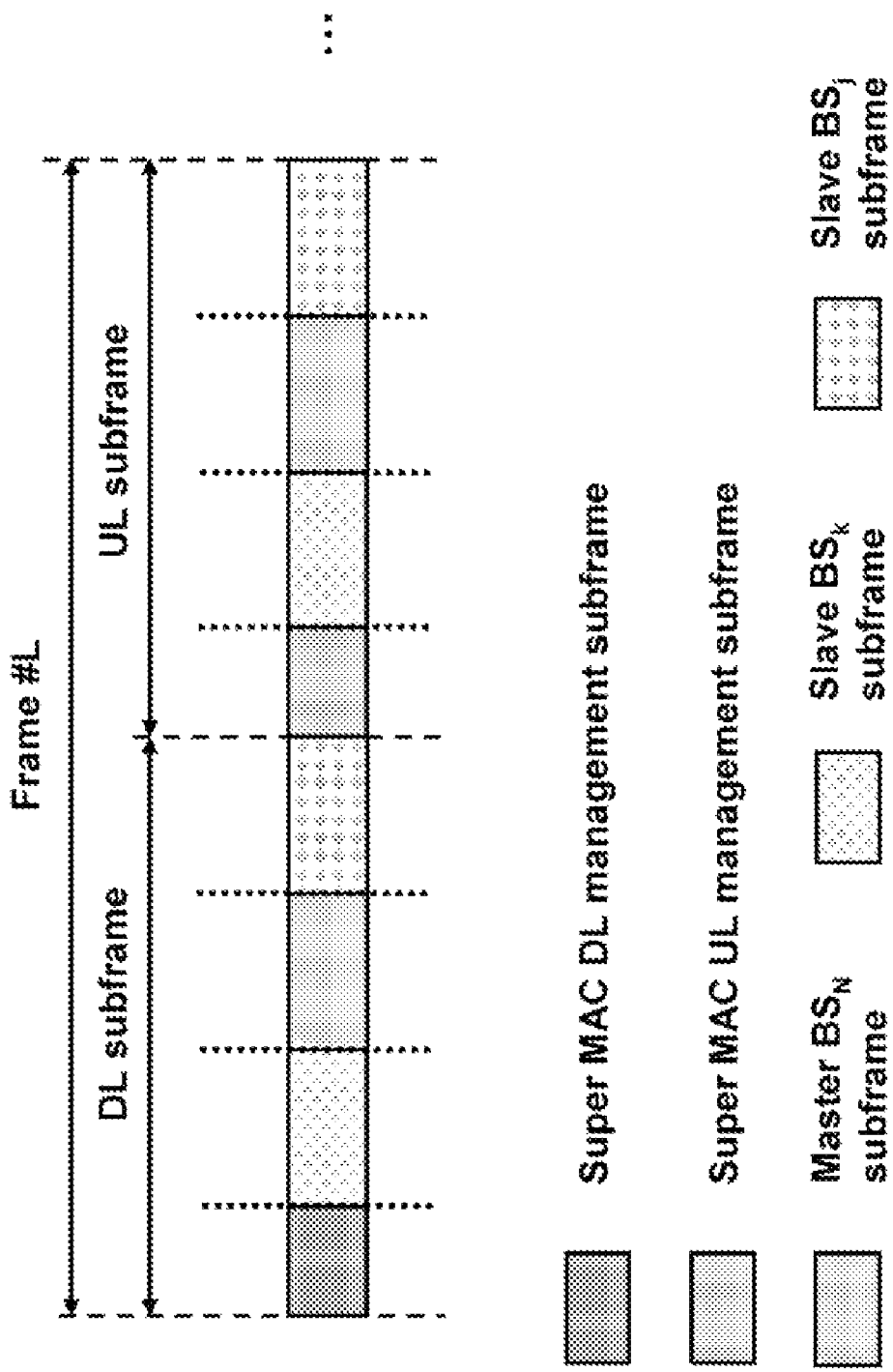
FIG. 9 illustrates an example of a MAC frame format suitable for some embodiments of the invention.
Figure 10:
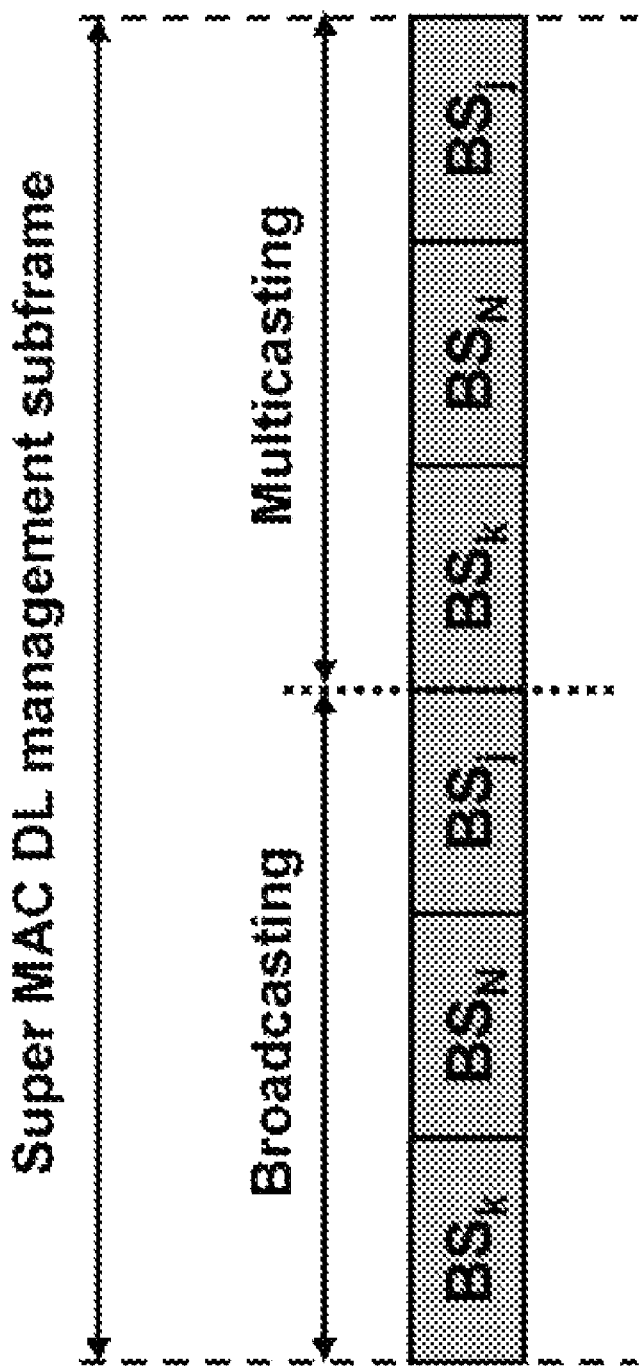
FIG. 10 illustrates an example of a MAC frame format suitable for some embodiments of the invention.
Figure 11:
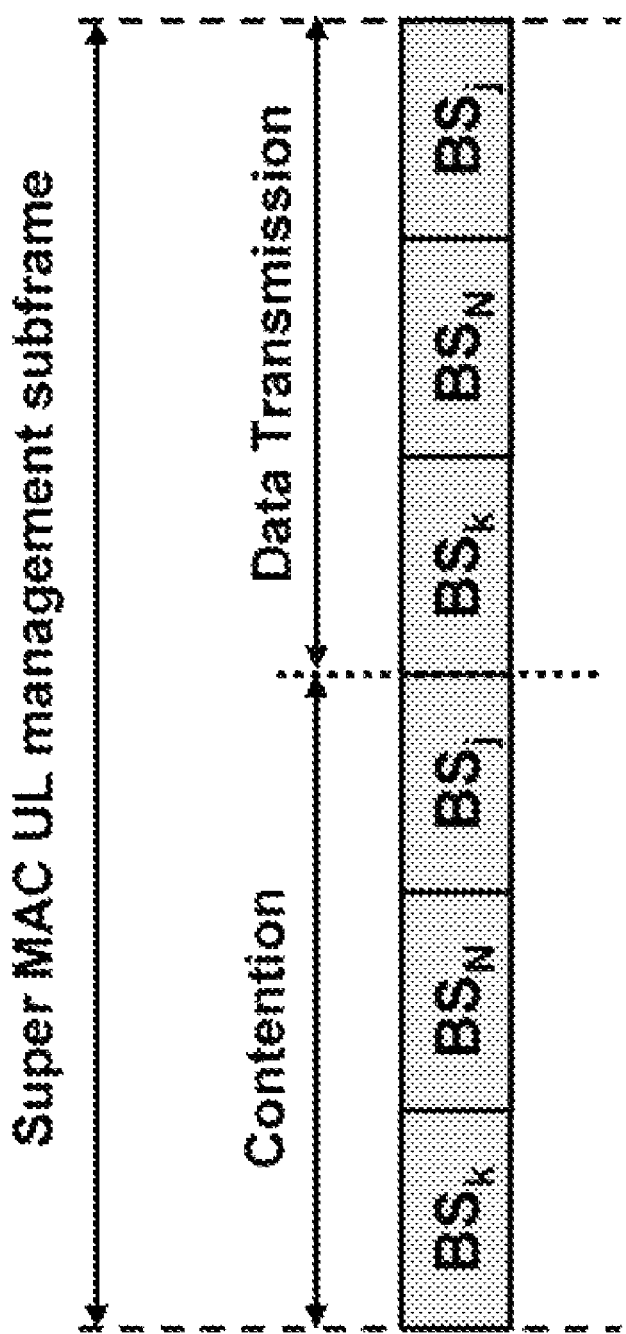
FIG. 11 illustrates an example of a MAC frame format suitable for some embodiments of the invention.

Specifically, the implementation of the different phases of the dynamic resource allocation uses a management mechanism introduced in the MAC frame structure presented in FIG. 5. The super MAC frame structure illustrated in FIG. 9 is used in the system. This super MAC frame is structured as follows (for the sake of simplicity, the illustration only considers 3 BSs-one BS ($BS_N$-101) for the master NW (103), one BS ($BS_k$-105) for slave $NW_k$ (107) and one BS ($BS_j$-109) for slave $NW_j$ (109):

Each MAC frame is divided into the super MAC Downlink (DL) and Uplink (UL) subframe,
A dedicated super MAC DL management subframe is used for the management of the DL subframe (and similarly a dedicated super MAC UL management subframe is used for the management of the UL subframe). The super MAC DL management subframe can specifically be used for transmission of messages from the master network to slave networks, and specifically for transmission of messages that may be considered offer request messages in that they provide information or indications in response to which the slave networks proceed to determine and submit offer values. Similarly, the MAC UL management subframe can specifically be used for transmission of messages from the slave networks to the master networks, and specifically for transmission of messages that may be considered offer messages in that they provide offer information to the master network.
The content of the super MAC DL and UL management subframes is structured to support the communications between the master $BS_N$ and any of the slave $BS_k$ during the different involved phases of the cycle,
Each master or slave subframe is composed of several MAC frames dedicated to the operation of one BS.
The position and the duration of the super MAC management subframes:
can e.g. be set for each frame and agreed between all NWs from the beginning (static approach),
can e.g. be periodically adapted between the NWs as function of time depending on the needs (dynamic approach). This could be achieved, for example, by wired information exchange between local BS databases via IP communication (via a server) between the involved NWs.
The super MAC DL management subframe is illustrated in FIG. 10 and is divided into two subframes as follows:
A broadcasting and a multicasting subframe,
Each is also divided into subframes. Each subframe is dedicated to one BS,
The broadcasting subframe is reserved for the "advertising/awareness" phase which will be described further later.
The multicasting subframe is reserved for:
the "first iteration (n=1) of the credit tokens based offer rounds"
the "$n^{th}$ iteration (n>1) of the dynamic credit tokens based offer rounds", and
the "final pricing and payment" phase (which will be described further later).
The super MAC UL management subframe is illustrated in FIG. 11 and is divided into two subframes as follows:
A contention and a data transmission subframe,
Each subframe is further divided into subframes. Each subframe is dedicated to one BS,
The contention subframe is reserved for the "Interest expressing phase",
The data transmission subframe is reserved for:
the "first iteration (n=1) of the credit tokens based offer rounds"
the "$n^{th}$ iteration (n>1) of the dynamic credit tokens based offer rounds, and
the "final pricing and payment" phase.

The organisation (in terms of position and duration) of the broadcasting, multicasting, contention and data transmissions subframes:
- can e.g. be set fixed for each frame and agreed between all NWs from the beginning (static approach),
- can e.g. be periodically adapted between the NWs as function of time depending on the needs (dynamic approach). This could be achieved, for example, by wired information exchange between local BS databases via IP communication (via a server) between the involved NWs.

In the following a specific example of a temporary resource allocation process using the described super MAC frames will be described with reference to the signalling example of FIGS. 7 and 8.

The process will be described with reference to different phases which correspond to different steps of FIG. 4. For each phase the communication and MAC frame mechanisms applied are described.

Phase 1: Advertising/Awareness Phase (Corresponding to Step 403 of FIG. 4)

This phase is divided into two sequences: (1) and (2) (ref FIG. 7):

In sequence (1), the master $BS_{N_{us}}$ broadcasts the following information to the surrounding slave $BS_k$s using an air interface broadcast channel: $T_{start}$, $T_{End}$, $T_{Start\ Renting}$, $T_{End\ Renting}$, RPA (Reserve Price Auction) value.

Figure 12:
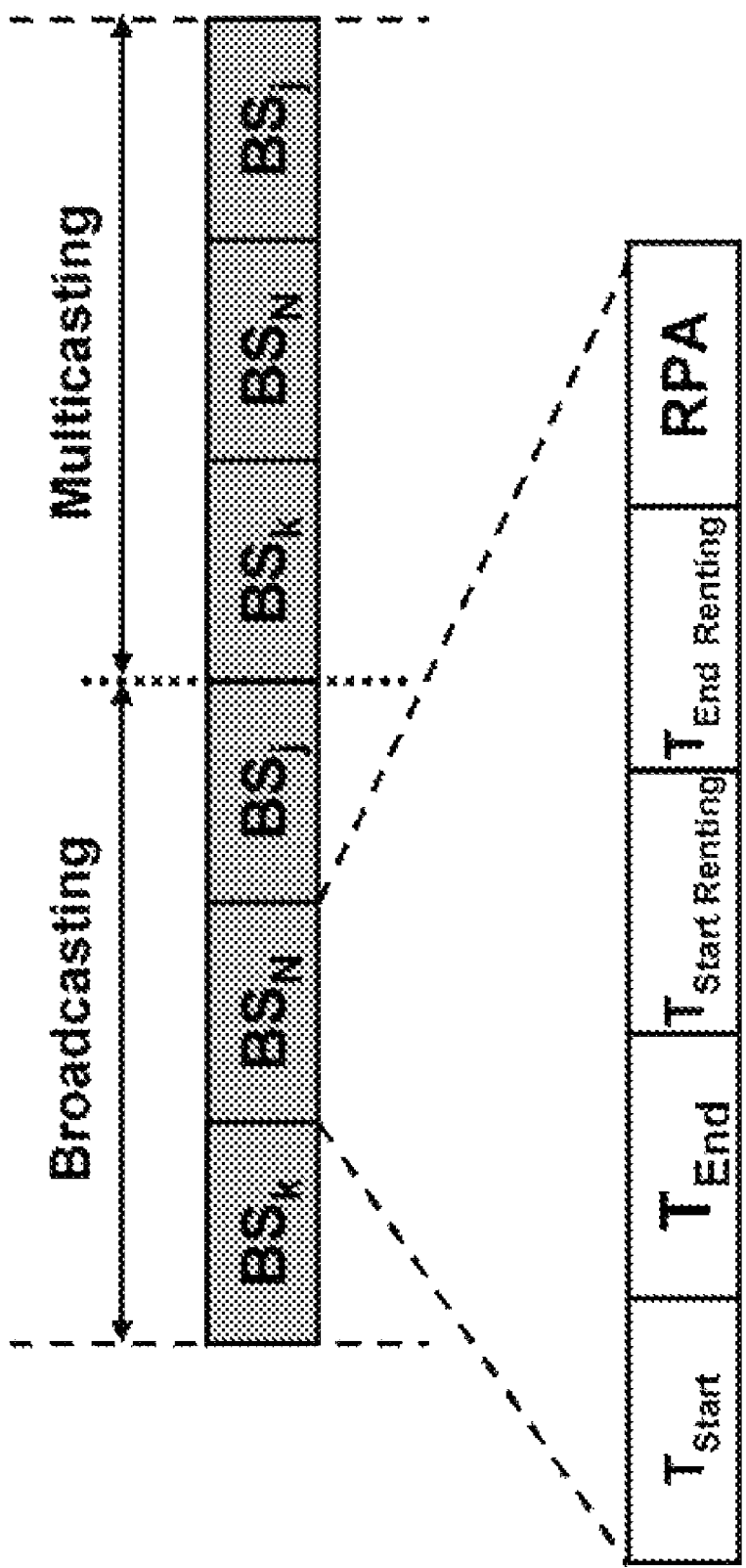
FIG. 12 illustrates an example of a MAC frame format suitable for some embodiments of the invention.

The MAC frame mechanisms enabling these operations can be implemented in the super MAC DL Management subframe illustrated in FIG. 12.

In sequence (2), the $BS_k$ interested in this additional bandwidth for its own purpose, broadcasts this information to its $SS_{j,k}$ to examine if these $SS_{j,k}$ are interested to enter into the bidding phase. At the MAC level, this information can be added in the existing broadcast messages (e.g. DL_MAP, DCD in IEEE 802.16) which are used in each slave BS ($BS_k$, $BS_j$) subframe in DL.

Phase 2: Interest Expressing Phase (Part of Step 403 of FIG. 4)

This phase is divided into 4 sequences (ref. FIG. 7) as follows:

In sequence (3), each $SS_{j,k}$ inquires its $CC_{i,j,k}$ to determine if they are interested in bidding, In sequence (4), each $SS_{j,k}$ receives from $CC_{i,j,k}$ the expression of interest (or non interest to participate in the bidding), In sequence (5), each $SS_{j,k}$ informs the $BS_k$ about the willingness (or not) of the $SS_{j,k}$ to participate to the bidding on the basis of the feedback received from sequence (4). At the MAC level, this information can be supported by adapting the existing messages (BW request contention slot+polling messages in IEEE 802.16) which are used by each slave BS ($BS_k$, $BS_j$) subframe.

Finally, in sequence (6), each $BS_k$ syntheses the feedback from each $SS_{j,k}$ and informs the master $BS_N$ about its willingness (or not) to participate in the bidding based on this feedback. If the $BS_k$ is interested, it communicates its $id_k$ to the master $BS_N$.

Figure 13:
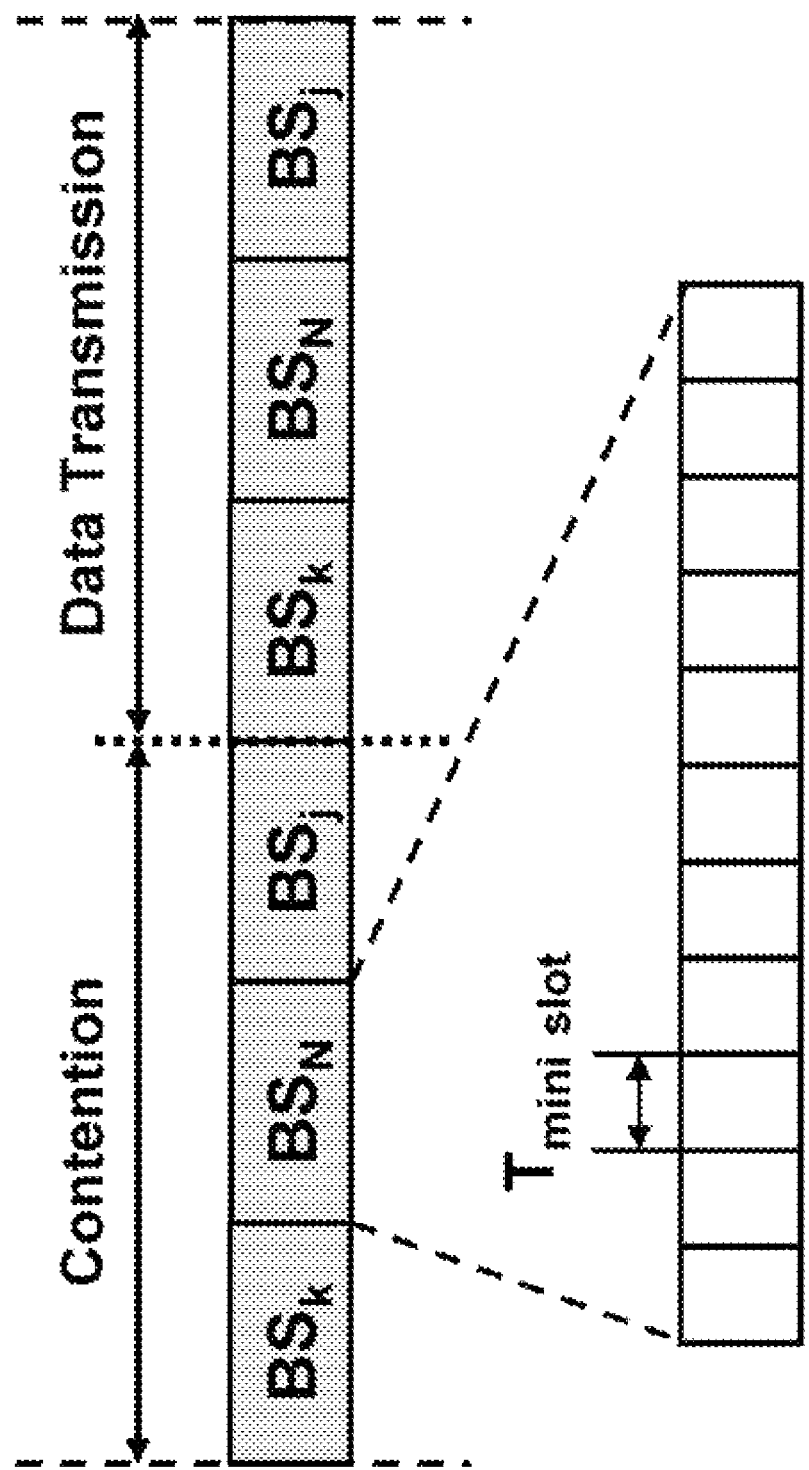
FIG. 13 illustrates an example of a MAC frame format suitable for some embodiments of the invention.

As the number of interested parties (surrounding slave $BS_S$) is unknown but typically will not to be very high, the MAC frame mechanisms enabling sequence (6) can be implemented in the super MAC UL Management subframe by using a contention subframe (contention mini slots). A contention mechanism (see FIG. 13) that can be used is the Slotted Aloha protocol (jointly with a collision resolution algorithm like a binary exponential back-off) but with the following adaptation: once a slave $BS_k$ has managed to send its $id_k$ information (i.e. it received successful acknowledgement from $BS_N$), its remains silent to let the others interested $BS_k$ transmit their $id_k$.

Phase 3: First Iteration (n=1) of the Credit Tokens Based Offer Rounds (Corresponding to Step 405 of FIG. 4)

This phase is divided into 7 sequences as follows:

In sequence (7), the master $BS_N$ sends the following information to the slave $BS_k$s that have expressed interest in participating in the bidding:

$T_{start\ Bidding}$: time from which the bidding phase will start, $T_{End\ Bidding}$: time at which the bidding phase will end ($T_{End\ Bidding} < T_{Start}$), DCD, DL-MAP for the management of the multicasting subframe of the super MAC DL management field. DCD (Downlink Channel Descriptor) provides the information on the physical layer parameters that will be used by the master $BS_N$ in the DL. This enables the $BS_k$ to know how they have to listen to the message provided by the master $BS_N$. DL_MAP (Downlink Minislot Allocation Protocol) provides information on the organisation of the multicasting subframe of sthen uper MAC DL field, i.e. the sequences of the messages, e.g.: first "UCD/UL-MAP, then "$T_{Start\ Bidding}$", and finally "$T_{End\ Bidding}$", UCD, UL-MAP for the management of the "data transmission" subframe of the super MAC UL management field. UCD (Uplink Channel Descriptor) provides information on the physical layer parameters that will be used by each slave $BS_k$ in the UL. This enables the $BS_N$ to know how its has to listen to the message provided by the slave $BS_k$. UL_MAP (Uplink Minislot Allocation Protocol) provides the information on the organisation of the "data transmission" subframe of the super MAC UL field, i.e. the sequence of the slots i.e. the assignment each slot to a $BS_k$=>provides the time when each $BS_k$ can transmit and with which information.

For this first iteration (n=1), the initial $\{id_k\}$ is denoted $\{id^{(1)}_k\}$.

Figure 14:
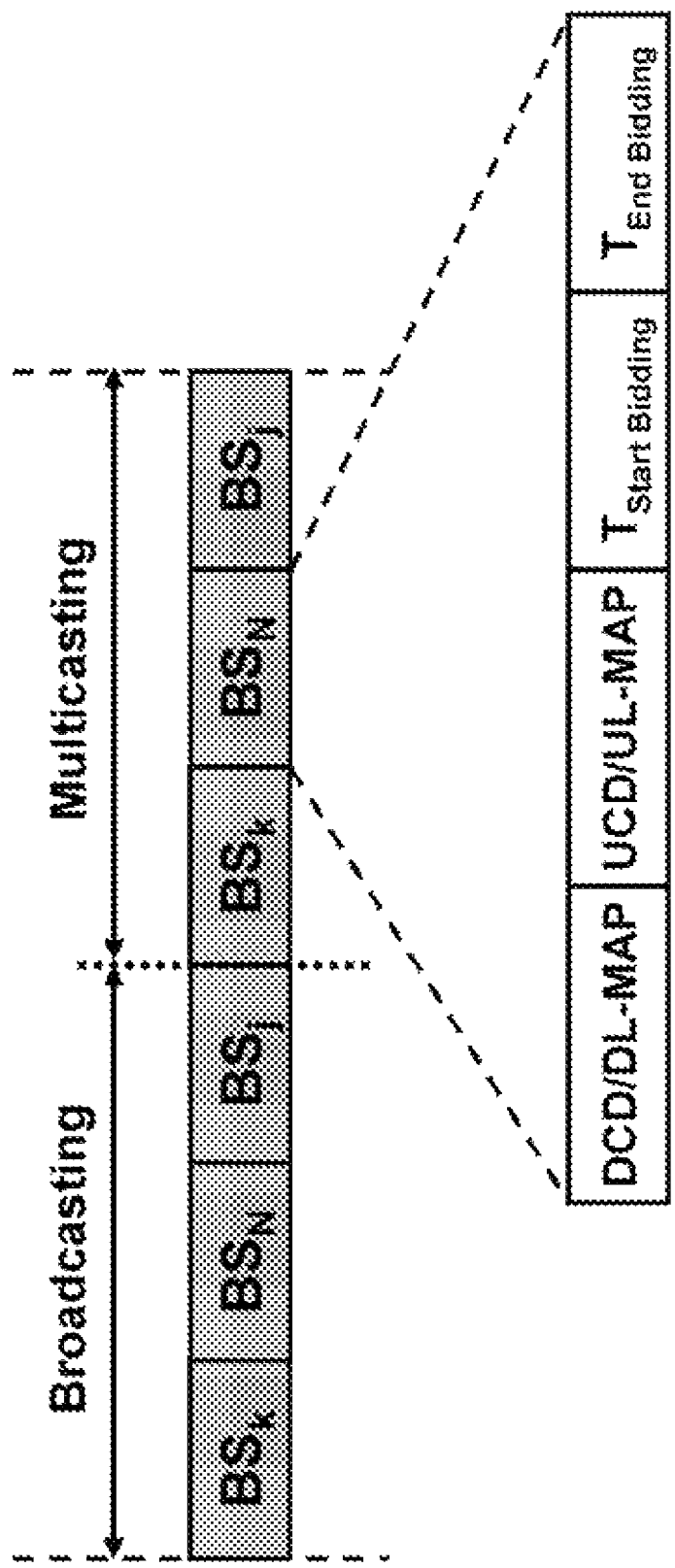
FIG. 14 illustrates an example of a MAC frame format suitable for some embodiments of the invention.

The MAC frame mechanisms enabling these operations can be implemented in the multicasting subframe of the super MAC DL management field as illustrated in FIG. 14:

In sequence (8), each $BS_k$ requests from each $SS_{j,k}$ its first (n=1) offer $SS\_CT^{(1)}_{j,k}$, In sequence (9), each $SS_{j,k}$ requests from $CC_{i,j,k}$ its first (n=1) offer $CC\_CT^{(1)}_{i,j,k}$, In sequence (10), each $CC_{i,j,k}$ sends its $CC\_CT^{(1)}_{i,j,k}$ to its $SS_{j,k}$, In sequence (11), each $SS_{j,k}$ collects $\{CC\_CT^{(1)}_{i,j,k}\}$, computes $SS\_CT^{(1)}_{j,k}$=sum($CC\_CT^{(1)}_{i,j,k}$) over i, and sends $SS\_CT^{(1)}_{j,k}$ to its $BS_k$, In sequence (12), each $BS_k$ collects $\{SS\_CT^{(1)}_{j,k}\}$, computes $BS\_CT^{(1)}_k$=sum($SS\_CT^{(1)}_{j,k}$) over j, and sends the following information to $BS_N$: $BID^{(1)}_k=\{BS\_CT^{(1)}_k, x_k, T_{Start\ k}, T_{End\ k}\}$.

For this first iteration, $CC\_CT^{(1)}_{i,j,k}$, $SS\_CT^{(1)}_{j,k}$ and $BS\_CT^{(1)}_k$ are expressed in quantified absolute (aggregate) value unit. Thus, the base station generates an offer value which is based on the individual offer values of the individual subscriber stations and connected equipment.

For this first iteration, the MAC frame mechanisms enabling the transmission of this information can be implemented as follows (see FIG. 14):

In the multicasting subframe of the super MAC DL management field, the UCD, UL-MAP provides the information to each $BS_k$ from $\{id^{(1)}_k\}$ at which moment each $BS_k$ will be able to transmit its $BID^{(1)}_k$ in the data transmission field of the super MAC UL management field.

Figure 15:
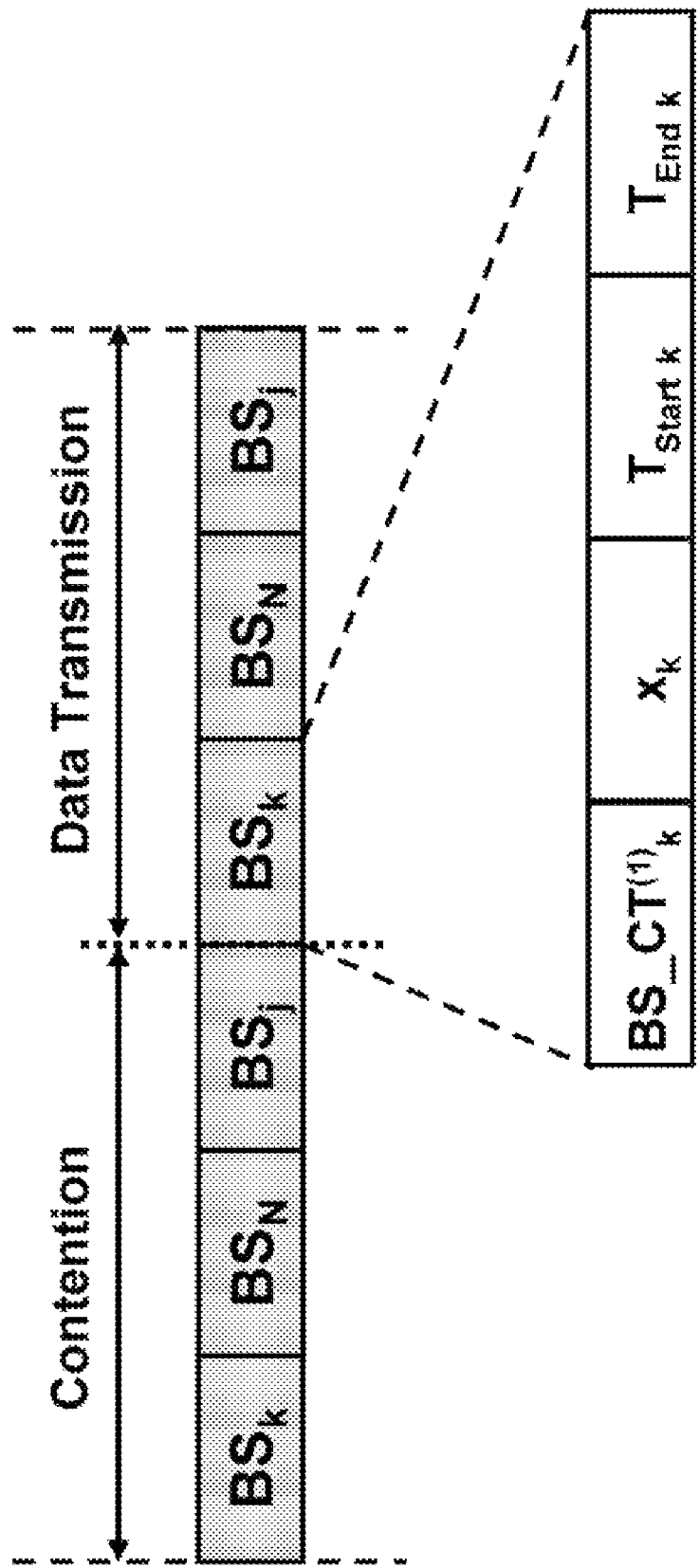
FIG. 15 illustrates an example of a MAC frame format suitable for some embodiments of the invention.

The data transmission field of the super MAC UL management field can be organised as shown in FIG. 15)

In sequence (13), $BS_N$ performs the following action:

Given the set of intervals $\{[T_{start\ k}, T_{End\ k}]\}$ received from different offerers $\{id^{(1)}_k\}$, $BS_N$ partitions $\{[T_{start}, T_{End}]\}$ into contiguous time segments $\{TS_m\}$, The different offerers $\{id^{(1)}_k\}$ assigned to a given $TS_m$ are identified by $\{id^{(1)}_{k,m}\}$. $\{id^{(1)}_{k,m}\}$ compete for each $TS_m$. Each involved offerer $id^{(1)}_{k,m}$ competes with his respective offer $BID^{(1)}_k$, Then, for each $TS_m$, the master $BS_N$ calculates the payoff $P^{(1)}_k = BS\_CT^{(1)}_k * X_k * T_{Renting} * N_{Frame\ m}$ for each offerer k, and searches the subset ($\{id^{(1)}_{k,m}\}$ selected) of $\{id^{(1)}_{k,m}\}$ such that $sum(x_k)=1$ and $sum(P^{(1)}_k)$ is maximal (a Knapsack algorithm can e.g. be used), For each $TS_m$, $BS_N$ informs all $\{id^{(1)}_{k,m}\}$ about $P^{min,\ (1)}_m$ and $P^{max,\ (1)}_m$ where $P^{min,\ (1)}_m$ is the minimal payoff from $\{id^{(1)}_{k,m}\}_{selected}$ and $P^{max,\ (1)}_m$ is the maximal payoff from $\{id^{(1)}_{k,m}\}_{selected}$ during the first iteration. With this approach, each $BS_k$ is directly informed whether it has been selected or not, and has some information on how far it is from $P^{min,\ (1)}_m$ while still having some information on $P^{max,\ (1)}_m$. This approach allows the privacy of competing $\{id^{(1)}_{k,m}\}$ on $TS_m$ to be maintained.

Thus, this message can be received by a base station and considered to be an offer request allowing the base station to generate and submit further offer values. Furthermore, the offer request message comprises an indication of the offer values determined in the previous offer round.

Figure 16:
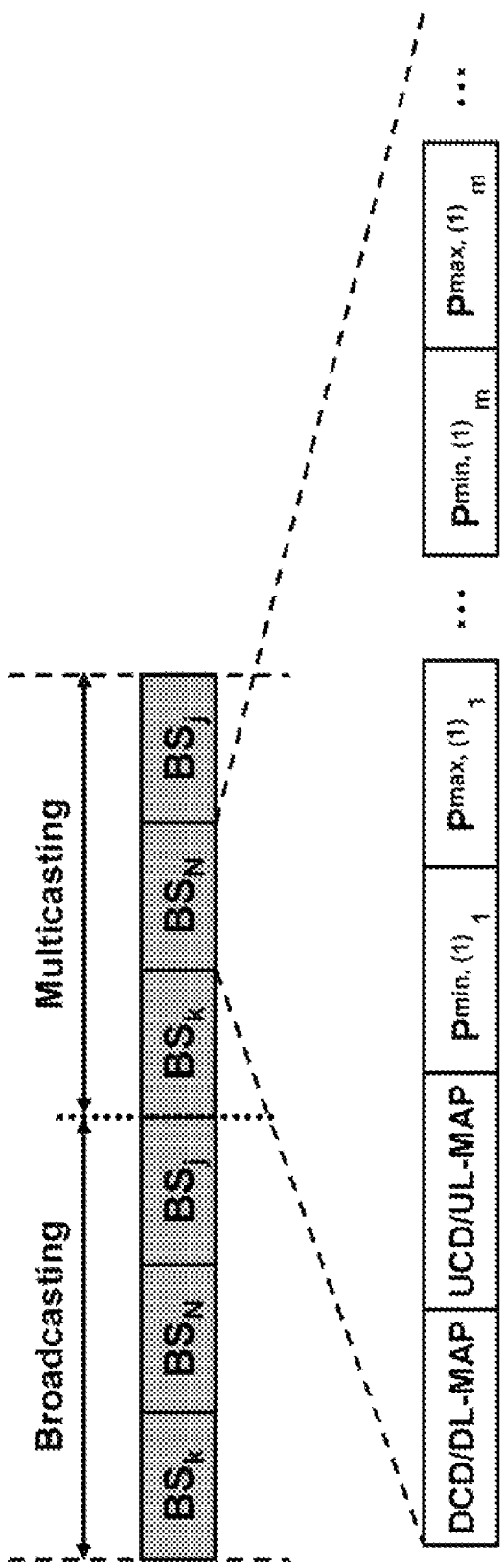
FIG. 16 illustrates an example of a MAC frame format suitable for some embodiments of the invention.

The MAC frame mechanisms enabling the transmission of this information can be implemented as illustrated in FIG. 16.

In particular, the DCD/DL-MAP provides the necessary information when each $id^{(1)}_{k,m}$ has to listen to the multicasting subframe so that each $id^{(1)}_{k,m}$ only listens to the part dedicated to it (i.e. related to its $TS_m$).

Phase 4 $n^{th}$ Iteration of the Credit Tokens Based Offer Rounds (Corresponding to Step 405 of FIG. 4)

This phase is divided into 6 sequences:

If $P^{(1)}_k < P^{min,\ (1)}_m$, this means that $BS_k$ has not been selected for being granted the resources which it previously made an offer for. In that case, in sequence (14), each $BS_k$ requests from each $SS_{j,k}$ its $2^{nd}$ (n=2) offer $SS\_CT^{(n)}_{j,k}$. More generally speaking, for n>1, if $P^{(n-1)}_k < P^{min,\ (n-1)}_m$, each $BS_k$ requests from each $SS_{j,k}$ its $n^{th}$ offer $SS\_CT^{(n)}_{j,k}$, In sequence (15), if $P^{(n-1)}_k < P^{min,\ (n-1)}_m$, each $SS_{j,k}$ requests from $CC_{i,j,k}$ its $n^{th}$ offer $CC\_CT^{(n)}_{i,j,k} \geq CC\_CT^{(n-1)}_{i,j,k}$ in case $CC_{i,j,k}$ wants to keep offering, In sequence (16), each $CC_{i,j,k}$ informs its $SS_{j,k}$ if it wants to continue to make an offer, and if so, it sends its new offer $CC\_CT^{(n)}_{i,j,k}$. For the non interested $CC_{i,j,k}$, $CC\_CT^{(n)}_{i,j,k} = CC\_CT^{(n-1)}_{i,j,k}$, In sequence (17), each $SS_{j,k}$ collects $\{CC\_CT^{(n)}_{i,j,k}\}$, computes $SS\_CT^{(n)}_{j,k} = sum(CC\_CT^{(n)}_{i,j,k})$ over i, and sends $SS\_CT^{(n)}_{j,k}$ to its $BS_k$, In sequence (18), each $BS_k$ collects $\{SS\_CT^{(n)}_{j,k}\}$, computes $BS\_CT^{(n)}_k = sum(SS\_CT^{(n)}_{j,k})$ over j. Next, $BS_k$ computes the new $P^{(n)}k = BS\_$ $CT^{(n)}_k * x_k * T_{Renting} * N_{Frame\ m}$ where $x_k$, $T_{Renting}$ and $N_{Frame\ m}$ are common for all n on $TS_m$.

If $P^{(n)}_k > P^{(n-1)}_k$ and $P(n)_k > P^{min,\ (n-1)}_m$, $BS_k$ expresses its interest to keep on participating in the offer process with the new bid $P^{(n)}_k$. In that case, it sends the new (update) value of $BS\_CT^{(n)}_k$ to $BS_N$. In case $P^{(n)}_k = P^{(n-1)}_k$ or $P^{(n)}_k < P^{min,\ (n-1)}_m$, $BS_k$ leaves the offering process and will not be granted additional resources.

Figure 17:
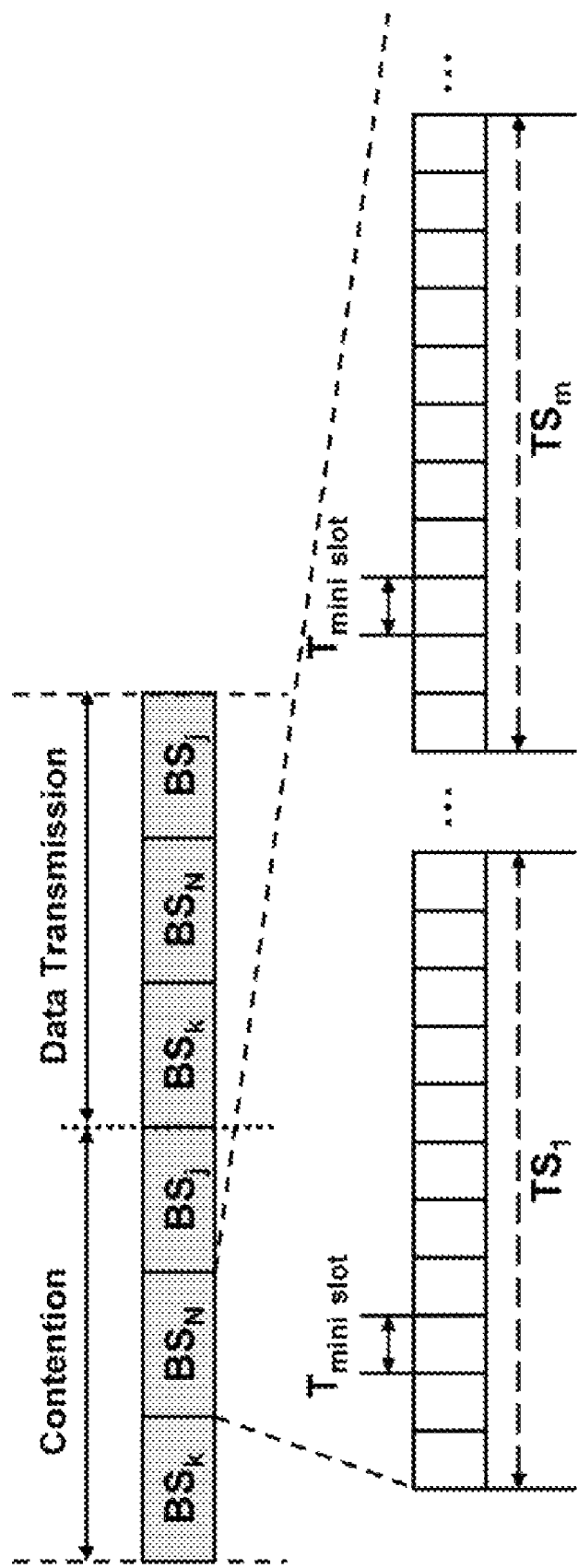

A MAC frame mechanism enabling the transmission of this information $BS\_CT^{(n)}_k$ can be implemented as follows:

For each $TS_m$, each $BS_k$ who has expressed the need to send its $BS\_CT^{(n)}_k$, enters into a reservation phase in the contention subframe of the super MAC UL management field. This contention subframe (see FIG. 17) enables the $BS_k$ to communicate its $id_k$ to the $BS_N$. This is achieved by using contention mini slots (slotted Aloha protocol jointly with a collision resolution algorithm like a binary exponential back-off) but with the following adaptation: once a slave $BS_k$ has managed to send its $id_k$ information (i.e. it received successful acknowledgement from $BS_N$), it remains silent to let the other interested $BS_k$ transmit their $id_k$.

For each $TS_m$, based on the received $\{id_k\}$, $BS_N$ assigns dedicated data slots to each $BS_k$ in the data transmission subframe of the super MAC UL management field. This information on data assignment is included in the UCD/UL-MAP field of the multicasting subframe of the super MAC DL management.

Figure 18:
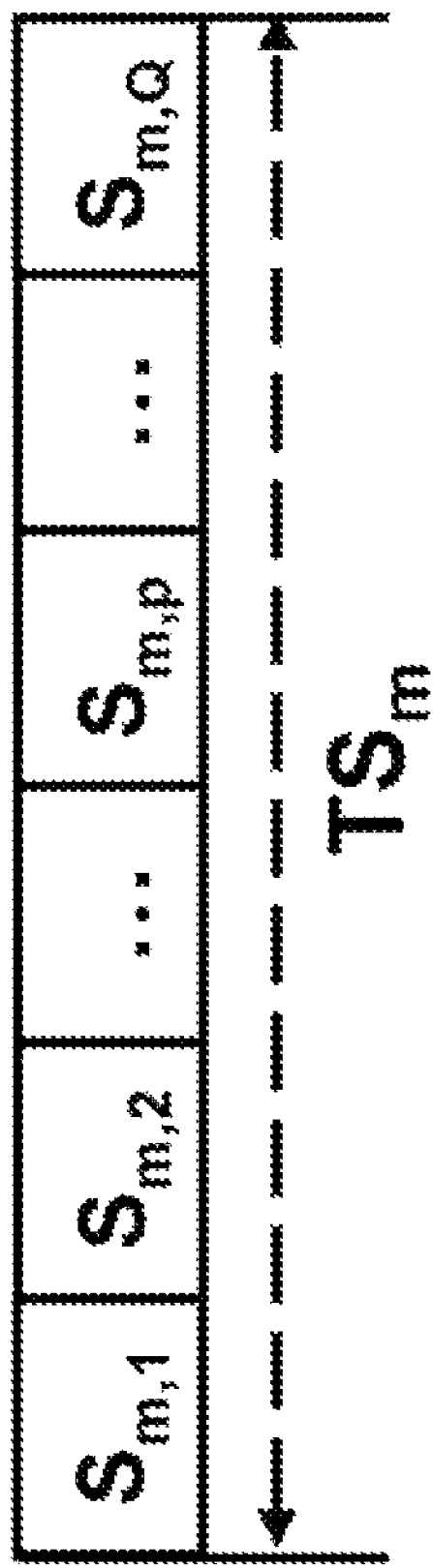
FIG. 18 illustrates an example of a MAC frame format suitable for some embodiments of the invention.

For each $TS_m$, in its dedicated data slots, each $BS_k$ can transmits its $BS\_CT^{(n)}_k$ in an incremental fashion (instead of providing the absolute value) as follows:

Based on the knowledge of $P^{min,\ (n)}_m$ and $P^{max,\ (n)}_m$, $BS_N$ proposes several pre defined Q discrete steps $\{S_{m,p}\}$ to facilitate each $BS_k$ expressing their relative increase between the iteration n−1 and n on $TS_m$. Q is an integer. $\{S_{m,p}\}$ can be represented/coded by the field indicated in FIG. 18.

Figure 19:
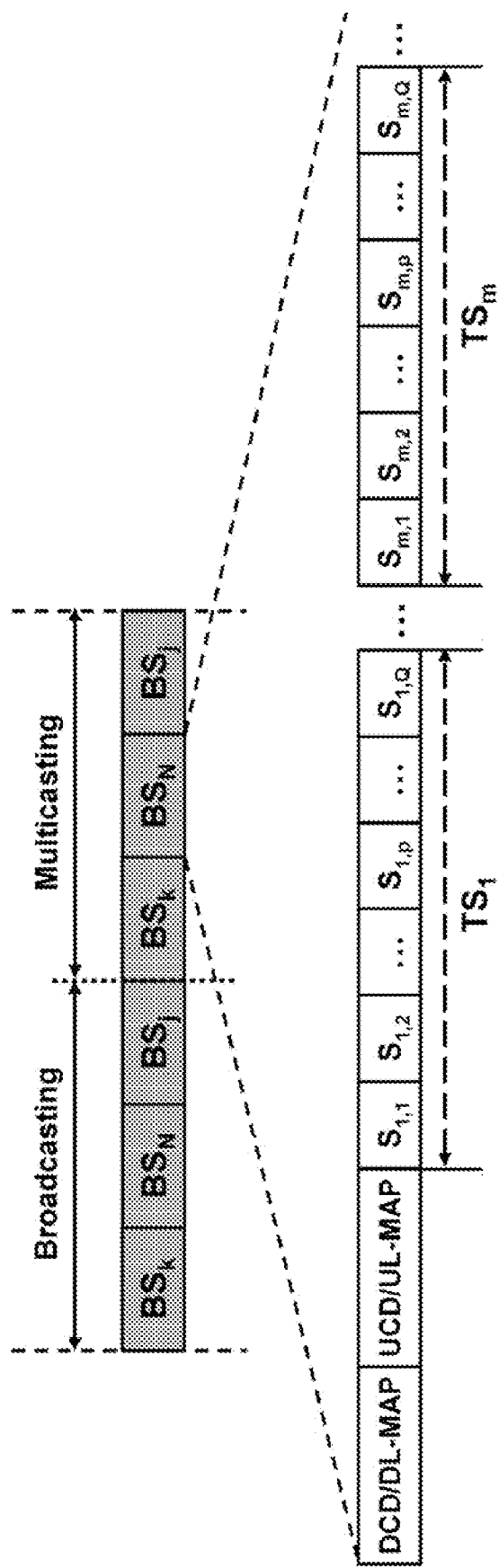
FIG. 19 illustrates an example of a MAC frame format suitable for some embodiments of the invention.

This field is multicast in the "multicasting subframe" of the super MAC DL management field as shown in FIG. 19.

For each $BS_k$, this relative increase between the iteration n−1 and n is noted $\Delta^{(n)}_k$ and can be expressed as follows: $\Delta^{(n)}_k = BS\_CT^{(n)}_k - BS\_CT^{(n-1)}_k = a_{k,1}S_{m,1} + a_{k,2}S_{m,2} + \ldots + a_{k,Q}S_{m,Q} = \Sigma a_{k,p}S_{m,p}$ over all p, p varying from 1 to Q. Let be $A_k = [a_{k,p}]$.

Figure 20:
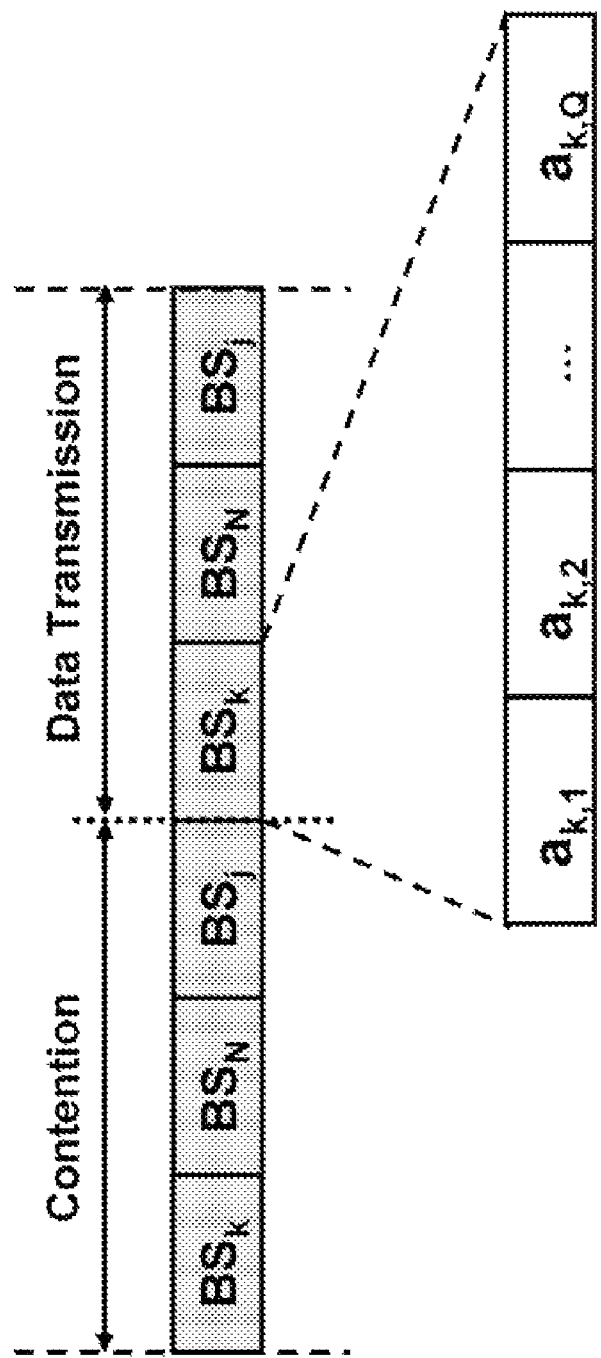
FIG. 20 illustrates an example of a MAC frame format suitable for some embodiments of the invention.

Each $BS_k$ calculates each $a_{k,p}$ to reach $BS\_CT^{(n)}_k$. Next, $BS_k$ transmits $A_k$ to $BS_N$ in the data transmission field of the super MAC UL management field as shown in FIG. 20.

In the multicasting subframe of the super MAC DL management field, the UCD/UL-MAP provides the information to each $BS_k$ from $\{id^{(n)}_k\}$ at which moment each $BS_k$ will be able to transmit its $A_k$ in the data transmission field of the super MAC UL management field.

Specifically, the following two options can be used for this UL data transmission:

The data transmission field (see FIG. 20) is split into subframes. Each subframe is dedicated to a $BS_k$ for the transmission of $A_k$.

Each $BS_k$ is polled by $BS_N$ to transmit its data $A_k$.

The incremental approach may allow a reduced bandwidth while still providing some flexibility.

The incremental method can also be applied in sequence (17) between each $SS_{j,k}$ and its assigned $BS_k$. In the particular case of IEEE 802.16, this can be achieved by adapting the existing "contention slot for bandwidth requests" field of the UL subframe, and the DCD, UCD, DL-MAP, UL-MAP fields.

In sequence (19), $BS_N$ updates $\{id^{(n-1)}_{k,m}\}$ into $\{id^{(n)}_{k,m}\}$. Based on the new received offer values $\{BS\_CT^{(n)}_k\}$ for each $TS_m$, the master $BS_N$ calculates the new payoff $P^{(n)}_k = BS\_CT^{(n)}_k * x_k * T_{Renting} * N_{Frame\ m}$ for each offerer k who still participates in the bidding. Then, $BS_N$ searches the subset $(\{id^{(n)}_{k,m}\}_{selected})$ of $\{id^{(n)}_{k,m}\}_{such\ as\ sum(xk)} = 1$ and $sum(P^{(n)}_k)$ is maximal (the Knapsack algorithm can be used for this purpose). Next, $BS_N$ performs the same actions as in sequence (13): for each $TS_m$, $BS_N$ informs all $\{id^{(n)}_{k,m}\}$ about $P^{min,\ (n)}_m$ and $P^{max,\ (n)}_m$ where $P^{min,\ (n)}_m$ is the minimal payoff from $\{id^{(n)}_{k,m}\}_{selected}$ and $P^{max,\ (n)}_m$ is the maximal payoff from $\{id^{(n)}_{k,m}\}_{selected}$ during the $n^{th}$ iteration. The difference with sequence (13) is that now the MAC frame mechanisms enabling the transmission of $\{P^{min,\ (n)}_m\}$ and $\{P^{max,\ (n)}_m\}$ is implemented with an incremental mechanism as used in sequence (18). For each $TS_m$, only the relative values (difference) $\Delta P^{min,\ (n)}_m = P^{min,\ (n)}_m - P^{min,\ (n-1)}_m$ and $\Delta P^{max,\ (n)}_m = P^{max,\ (n)}_m - P^{max,\ (n-1)}_m$) are transmitted in the "multicasting subframe" of the super MAC DL management field.

Phase 5: Final Pricing and Payment Phase (Corresponding to Steps 407, 409 of FIG. 4)

This phase is composed of the sequences (20) and (21):

In sequence (20), as long as $T_{End\ Bidding} - T_{Start\ Bidding} > 0$ (i.e. the bidding phase duration has not yet elapsed), n is increased and the credit tokens based offer rounds are executed.

In sequence (20), when $T_{End\ Bidding} - T_{Start\ Bidding} = 0$, the offer rounds phase is over. None of the $BS_k$ can now make a new offer. $\{id^{(n\ final)}_{k,m}\}_{selected}$ is derived. At this point, $BS_N$ derives the clearing price auction $BS\_CPA_k$ (expressed as a number of credit tokens per dimension unit) for each $TS_m$ and each k from $\{id^{(n\ final)}_{k,m}\}$. For each k and m, $BS\_CPA_k$ can correspond to the $BS\_CT^{(final)}_k$, or for example can follow the Vickrey's second price auction method.

The MAC frame mechanisms enabling the transmission of this information $\{BS\_CPA_k\}$ to each $BS_k$ from $\{id^{(n\ final)}_{k,m}\}$ are implemented in the multicasting field of the super MAC DL management field. $BS_N$ sends this information to each $BS_k$ in a dedicated slot.

In sequence (21), each k pays $Pr_k = BS\_CPA_k * x_k * T_{Renting} * N_{Frame\ m}$ on its corresponding $TS_m$.

On the basis of the information sent in the multicasting field of the super MAC DL management field in sequence (20), two MAC mechanisms can specifically be used (similar to sequence (18)) for the UL data transmission of $Pr_k$:

The data transmission field is split into subframes (similar to FIG. 20). Each subframe is dedicated to a $BS_k$ for the transmission of $Pr_k$.

Each $BS_k$ is polled by $BS_N$ to transmit its data $Pr_k$.

Phase 6 Credit Tokens Based Bandwidth Granting Phase (Corresponding to Step 409 of FIG. 4)

During this phase, each winning $BS_k$ grants its resources to its $SS_{j,k}$ and $CC_{i,j,k}$. Currently, grant mechanisms (e.g. in IEEE 802.16-2004) are either per CC or per SS. In the specific detailed example, these mechanisms are extended by being combined with the credit token paradigm. The two following grants options can specifically be used:

Credit tokens based grant per CC (CtG_CC)

Figure 21:
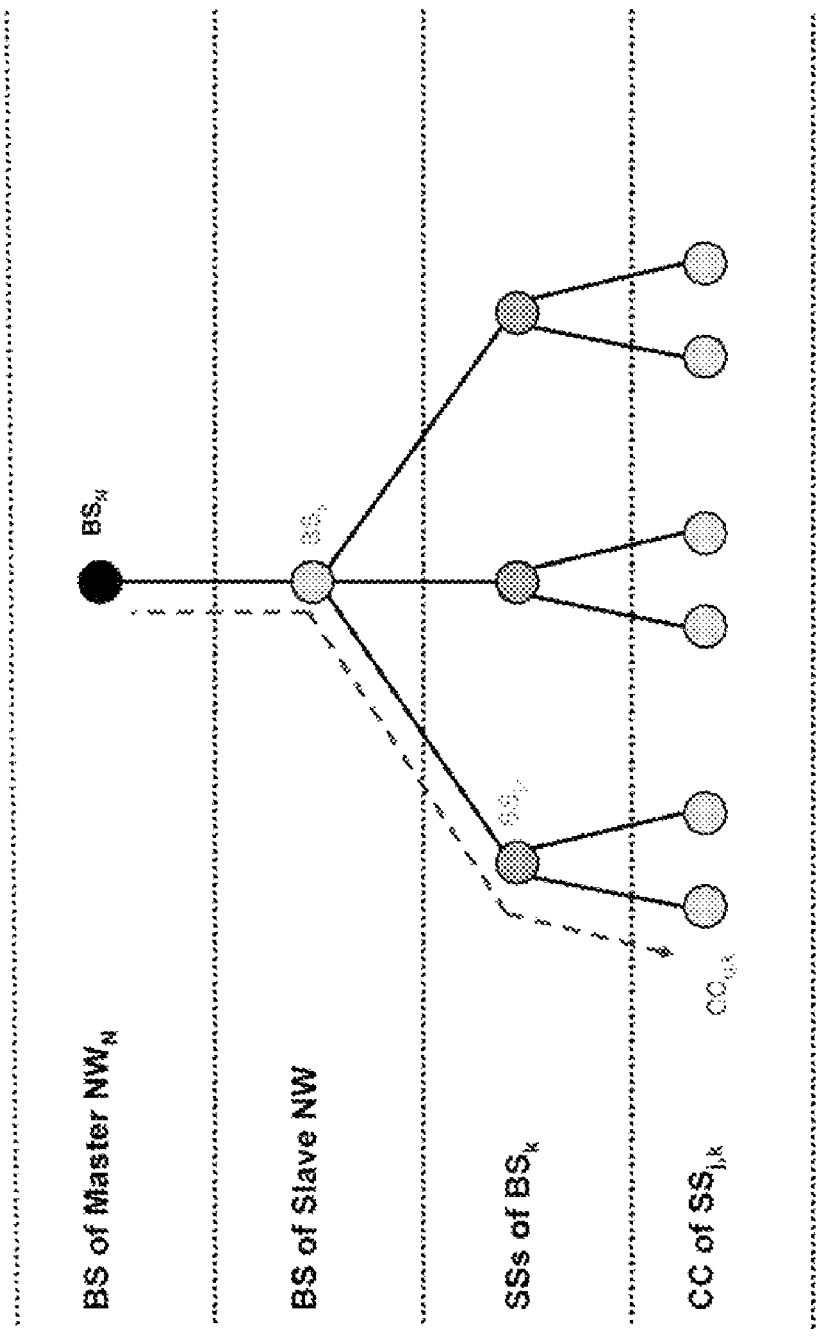
FIG. 21 illustrates an example of a resource allocation communication in accordance with some embodiments of the invention.

In this case (ref. FIG. 21), the bandwidth is granted at the CC level. Thus, the resource allocation message can be transmitted directly to a connected equipment. The bandwidth is granted to the $CC_{i,j,k}$ which have participated in the offering rounds. The amount of resources granted to each $CC_{i,j,k}$ is proportional to the max value of $CC\_CT_{i,j,k}$ that the $CC_{i,j,k}$ has made an offer for. In this case, the $BS_k$ is in charge of the resources scheduling between all $CC_{i,j,k}$ attached to that $BS_k$.

Credit Tokens Based Grant per SS (CtG_SS)

Figure 22:
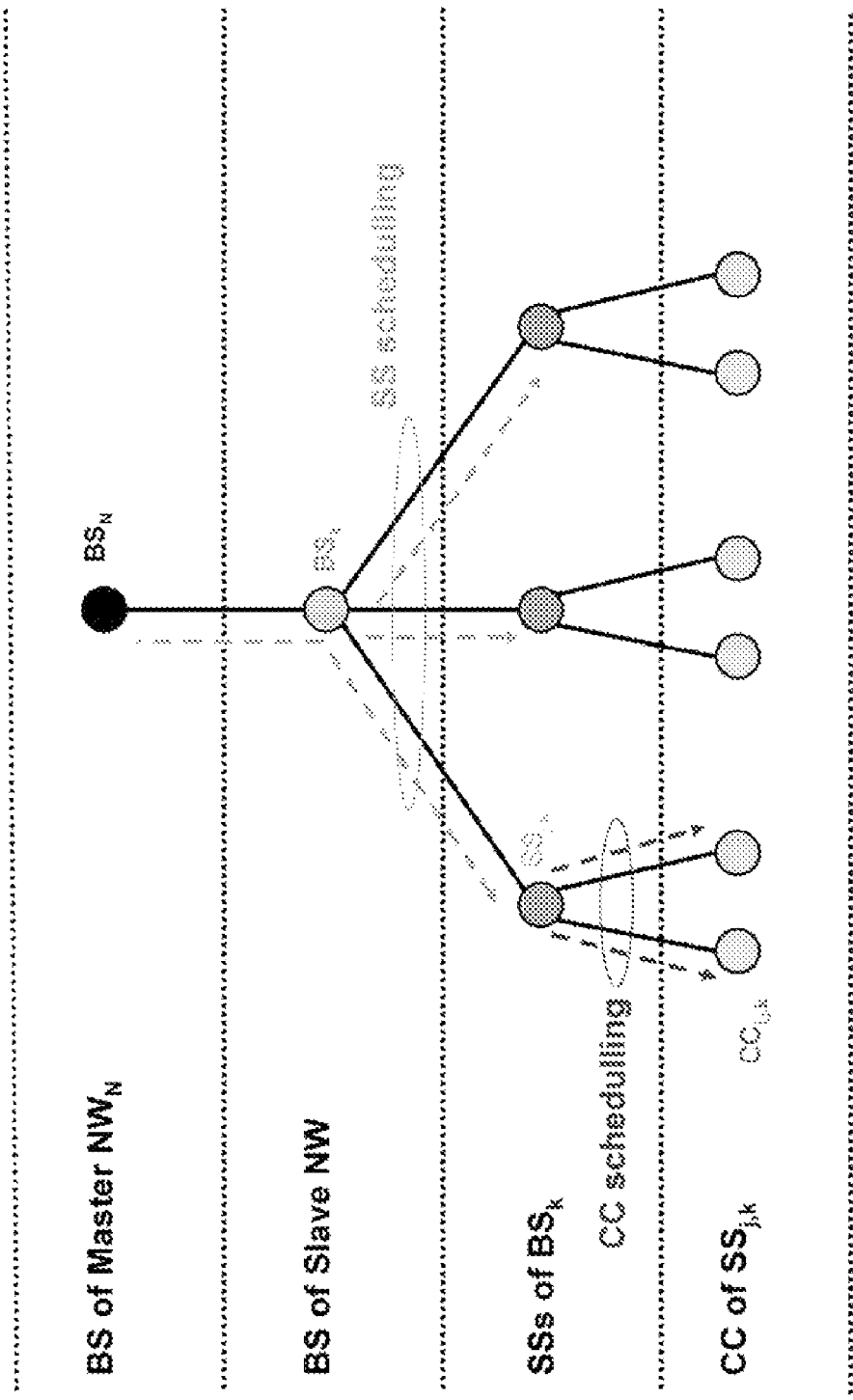
FIG. 22 illustrates an example of a resource allocation communication in accordance with some embodiments of the invention.

In this case (ref. FIG. 22), the bandwidth is granted at the SS level. Thus, the resource allocation message can be transmitted directly to a Subscriber Station. The bandwidth is granted to each $SS_{j,k}$ which participated in the offering rounds. The amount of resources granted to each $SS_{j,k}$ is proportional to the max value of $SS\_CT_{j,k}$ that the $SS_{j,k}$ has made an offer for. In this case, $BS_k$ is in charge of the resources scheduling between all $SS_{j,k}$ attached to that $BS_k$. Then, each $SS_{j,k}$ is in charge of the allocation of resources between all $CC_{i,j,k}$ attached to that $SS_{j,k}$.

Depending on the strategy (CtG_CC or CtG_SS) considered, either the sequence (22-1) or (22-2) is used. For both strategies, in the case of IEEE 802.16, the MAC mechanisms to be used can be achieved by adapting the existing DCD/DL-MAP, UCD/UL-MAP fields.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

The invention claimed is:

1. A method of resource sharing between a plurality of communication networks each having a nominal resource allocation of a shared air interface resource and a resource exchange allowance, the method comprising:
   initiating, by a sharing instigation processor, a temporary resource allocation of a first air interface resource from a nominal resource allocation of a first network;
   executing a plurality of offer rounds including offer requests to a first plurality of networks, each offer round comprising determining offer values for the first air interface resource;
   selecting, by a selection processor, a second network from the first plurality of networks in response to the determined offer values;
   sending, by a transceiver, a resource allocation message to the second network, the resource allocation message indicating a temporary allocation of at least part of the first air interface resource from the nominal resource allocation of the first network to the second network; and
   reducing, by a resource exchange allowance processor, the resource exchange allowance of the second network by a value determined in response to a resource exchange offer value from the second network;
   and wherein each offer round comprises:
      the first network transmitting the offer request to the first plurality of networks;
      the first plurality of networks transmitting offer messages to the first network in response to the offer request, each offer message comprising the resource exchange offer value a particular network from the first plurality of networks is willing to offer in return for the temporary allocation of the at least part of the first air interface resource from the nominal resource allocation of the first network; and
      determining the offer values for the first air interface resource in response to the resource exchange offer values.

2. The method of claim 1 wherein the offer request of at least one offer round comprises an indication of offer values determined in a previous offer round.

3. The method of claim 1 wherein the first network transmitting offer requests to the first plurality of networks comprises the first network transmitting the offer request to a base station of one of the first plurality of networks, the determination of offer values further comprising:
   the base station transmitting subscriber station offer requests to subscriber stations of the base station;
   at least one of the subscriber stations transmitting a subscriber station offer message to the base station, the subscriber station offer message comprising a subscriber station resource exchange offer value; and
   the base station determining the resource exchange offer value in response to the subscriber station resource exchange offer value and transmitting the resource exchange offer value to the first network.

4. The method of claim 3 wherein the sending the resource allocation message to the second network comprises sending the resource allocation message directly to a subscriber station of the second network.

5. The method of claim 3 further comprising:
   at least one of the subscriber stations transmitting connected equipment offer requests to connected equipment of the at least one of the subscriber stations;
   at least one of the connected equipments transmitting a connected equipment offer message to the at least one of the subscriber stations, the connected equipment offer message comprising a connected equipment resource exchange offer value; and
   the at least one of the subscriber stations determining the subscriber station resource exchange offer value in response to the connected equipment resource exchange offer value.

6. The method of claim 5 wherein the sending the resource allocation message to the second network comprises sending the resource allocation message directly to a connected equipment of the second network.

7. The method of claim 1 comprising selecting the second network in response to a determination that the resource exchange offer value from the second network for the at least part of the first air interface resource is the highest received resource exchange offer value.

8. The method of claim 1 comprising selecting a plurality of selected networks and allocating different parts of the first air interface resource to the plurality of selected networks so as to maximise the combined resource exchange offer values.

9. The method of claim 1 wherein the first plurality of networks employ a shared Media Access Control (MAC) frame and each of the plurality of communication networks has a nominal allocated time interval of the MAC frame.

10. The method of claim 9 wherein the MAC frame comprises a first management subframe for transmission of offer request messages.

* * * * *

UNITED STATES PATENT AND TRADEMARK OFFICE
CERTIFICATE OF CORRECTION

PATENT NO.         : 8,194,700 B2
APPLICATION NO.    : 11/917801
DATED              : June 5, 2012
INVENTOR(S)        : Grandblaise et al.

It is certified that error appears in the above-identified patent and that said Letters Patent is hereby corrected as shown below:

In Column 15, Line 51, delete "SS_CT(n) j,k." and insert -- SS_CT(2) j,k. --, therefor.

In Column 17, Line 9, delete "{id(n)k,m} such as sum (xk)=1" and insert -- {id(n)k,m} such as sum(xk)=1 --, therefor.

In Column 18, Line 4, delete "CC_CTij,k" and insert -- CC_CTi,j,k --, therefor.

Signed and Sealed this
Nineteenth Day of March, 2013

Teresa Stanek Rea
*Acting Director of the United States Patent and Trademark Office*